United States Patent
Huang et al.

(10) Patent No.: US 9,848,339 B2
(45) Date of Patent: Dec. 19, 2017

(54) VOICE SERVICE SOLUTIONS FOR FLEXIBLE BANDWIDTH SYSTEMS

(75) Inventors: Yuheng Huang, San Diego, CA (US);
Bongyong Song, San Diego, CA (US);
Edwin C. Park, San Diego, CA (US);
Samir Salib Soliman, Poway, CA (US);
Soumya Das, San Diego, CA (US);
Olunfunmilola O. Awoniyi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 13/494,683

(22) Filed: Jun. 12, 2012

(65) Prior Publication Data

US 2013/0148576 A1 Jun. 13, 2013

Related U.S. Application Data

(60) Provisional application No. 61/556,777, filed on Nov. 7, 2011, provisional application No. 61/568,742, filed
(Continued)

(51) Int. Cl.
*H04W 24/02* (2009.01)
*H04W 28/20* (2009.01)
(Continued)

(52) U.S. Cl.
CPC ........... *H04W 24/02* (2013.01); *H04W 28/20* (2013.01); *H04W 16/14* (2013.01); *H04W 28/22* (2013.01); *H04W 72/00* (2013.01); *H04W 72/04* (2013.01)

(58) Field of Classification Search
None
See application file for complete search history.

(56) References Cited

U.S. PATENT DOCUMENTS 5,117,443 A 5/1992 Shires
5,640,385 A 6/1997 Long et al.
(Continued)

FOREIGN PATENT DOCUMENTS

CN 1399855 A 2/2003
CN 1666453 A 9/2005
(Continued)

OTHER PUBLICATIONS

3GPP TS 25.213 "3rd Generation Partnership Project; Technical Specification Group Radio Access Network; Spreading and modulation," version 9.2.0, release 9, Sep. 2010.
(Continued)

*Primary Examiner* — Gregory Sefcheck
*Assistant Examiner* — Suk Jin Kang
(74) *Attorney, Agent, or Firm* — Holland & Hart LLP

(57) ABSTRACT

Methods, systems, and devices are disclosed for providing services, such as voice services, within flexible bandwidth systems. In general, the scaling of one or more aspects of a flexible bandwidth system may be compensated for through altering one or more aspects within a code domain. The tools and techniques may include scaling spreading factors (with rate matching tuning in some embodiments), multi-code transmission, code rate increases, AMR codec rate adjustments, and/or higher order modulation. Subframe decoding approaches for the reception scheme may also be utilized. These tools and techniques can be flexibly implemented on the mobile device and/or base station side. Some embodiments may also minimize the latency introduced by the transmission and/or reception process. Flexible bandwidths systems may utilize portions of spectrum that may be too big or too small to fit a normal bandwidth waveform.

48 Claims, 27 Drawing Sheets

Related U.S. Application Data on Dec. 9, 2011, provisional application No. 61/621,177, filed on Apr. 6, 2012.

(51) Int. Cl.
  *H04W 28/22* (2009.01)
  *H04W 16/04* (2009.01)
  *H04W 72/04* (2009.01)
  *H04W 16/14* (2009.01)
  *H04W 72/00* (2009.01)

(56) References Cited

U.S. PATENT DOCUMENTS

| | | |
|---|---|---|
| 5,949,767 A | 9/1999 | Shoji |
| 6,041,222 A | 3/2000 | Horton et al. |
| 6,236,647 B1 | 5/2001 | Amalfitano |
| 6,424,826 B1 | 7/2002 | Horton et al. |
| 6,449,596 B1 | 9/2002 | Ejima |
| 6,535,723 B1 | 3/2003 | Jiang et al. |
| 6,539,050 B1 | 3/2003 | Lee et al. |
| 6,693,887 B2 | 2/2004 | Stanwood et al. |
| 6,694,147 B1 | 2/2004 | Viswanath et al. |
| 6,829,227 B1 | 12/2004 | Pitt et al. |
| 6,845,238 B1 | 1/2005 | Mueller |
| 6,944,460 B2 | 9/2005 | Haartsen |
| 7,010,300 B1 | 3/2006 | Jones et al. |
| 7,069,035 B2 | 6/2006 | Chen et al. |
| 7,123,710 B2 | 10/2006 | Ravishankar |
| 7,123,910 B2 | 10/2006 | Lucidarme et al. |
| 7,145,876 B2 | 12/2006 | Huang et al. |
| 7,193,982 B2 | 3/2007 | Frerking et al. |
| 7,263,365 B2 | 8/2007 | Rudowicz et al. |
| 7,321,780 B2 | 1/2008 | Love et al. |
| 7,324,553 B1* | 1/2008 | Varier et al. ................. 370/468 |
| 7,394,792 B1 | 7/2008 | Von |
| 7,535,900 B2 | 5/2009 | Shenoi |
| 7,558,310 B1 | 7/2009 | Von |
| 7,602,707 B2 | 10/2009 | Guo et al. |
| 7,706,350 B2 | 4/2010 | Gorokhov et al. |
| 7,796,632 B2 | 9/2010 | Hasty et al. |
| 7,839,900 B1 | 11/2010 | Herder et al. |
| 7,865,359 B2 | 1/2011 | Chang |
| 7,898,947 B2 | 3/2011 | Briscoe et al. |
| 7,953,167 B2 | 5/2011 | Ode et al. |
| 7,969,858 B2 | 6/2011 | Laroia et al. |
| 8,000,706 B2 | 8/2011 | Lee et al. |
| 8,045,972 B2 | 10/2011 | Ferzali et al. |
| 8,054,893 B2 | 11/2011 | Mizusawa |
| 8,064,398 B2 | 11/2011 | Agashe et al. |
| 8,085,713 B2 | 12/2011 | Kang |
| 8,085,731 B2 | 12/2011 | Zhao et al. |
| 8,150,344 B1 | 4/2012 | Goyal et al. |
| 8,169,953 B2 | 5/2012 | Damnjanovic et al. |
| 8,325,670 B2 | 12/2012 | Afrashteh et al. |
| 8,514,883 B2 | 8/2013 | Pan et al. |
| 8,547,840 B1* | 10/2013 | Kumar et al. ................. 370/231 |
| 8,768,373 B2 | 7/2014 | Soliman et al. |
| 8,804,693 B2 | 8/2014 | Dural et al. |
| 8,837,375 B2 | 9/2014 | Das et al. |
| 8,873,505 B2 | 10/2014 | Zhang et al. |
| 9,049,633 B2 | 6/2015 | Das et al. |
| 9,055,496 B2 | 6/2015 | Das et al. |
| 2001/0012271 A1 | 8/2001 | Berger |
| 2002/0065089 A1 | 5/2002 | Soliman |
| 2002/0110101 A1* | 8/2002 | Gopalakrishnan et al. .. 370/335 |
| 2002/0158801 A1 | 10/2002 | Crilly et al. |
| 2002/0159501 A1 | 10/2002 | Agami et al. |
| 2003/0081538 A1 | 5/2003 | Walton et al. |
| 2003/0203721 A1 | 10/2003 | Berezdivin et al. |
| 2003/0224730 A1 | 12/2003 | Muszynski et al. |
| 2004/0128110 A1 | 7/2004 | Schulte et al. |
| 2005/0065784 A1 | 3/2005 | McAulay et al. |
| 2005/0208973 A1 | 9/2005 | Iochi |
| 2006/0171424 A1* | 8/2006 | Choi .............................. 370/536 |
| 2006/0246930 A1 | 11/2006 | Kim et al. |
| 2006/0250935 A1 | 11/2006 | Hamamoto et al. |
| 2006/0291429 A1 | 12/2006 | Matusz |
| 2007/0049307 A1* | 3/2007 | Mueckenheim et al. ..... 455/509 |
| 2007/0081604 A1 | 4/2007 | Khan et al. |
| 2007/0147226 A1 | 6/2007 | Khandekar et al. |
| 2007/0217440 A1 | 9/2007 | Cho et al. |
| 2007/0230414 A1 | 10/2007 | Afrashteh et al. |
| 2007/0268959 A1* | 11/2007 | Bi et al. ........................ 375/146 |
| 2008/0026752 A1 | 1/2008 | Flore et al. |
| 2008/0095108 A1 | 4/2008 | Malladi et al. |
| 2008/0144612 A1* | 6/2008 | Honkasalo et al. .......... 370/370 |
| 2008/0151743 A1 | 6/2008 | Tong et al. |
| 2008/0165892 A1 | 7/2008 | Yang et al. |
| 2008/0227453 A1 | 9/2008 | Somasundaram et al. |
| 2008/0253320 A1 | 10/2008 | Piggin et al. |
| 2008/0298442 A1 | 12/2008 | Deng et al. |
| 2009/0016320 A1 | 1/2009 | Li et al. |
| 2009/0042532 A1 | 2/2009 | Bienas et al. |
| 2009/0074039 A1 | 3/2009 | Miller |
| 2009/0094650 A1 | 4/2009 | Carmichael |
| 2009/0116389 A1 | 5/2009 | Ji et al. |
| 2009/0135713 A1 | 5/2009 | Hwang et al. |
| 2009/0141689 A1 | 6/2009 | Parekh et al. |
| 2009/0161732 A1 | 6/2009 | Miller et al. |
| 2009/0191863 A1 | 7/2009 | Kazmi |
| 2009/0252134 A1 | 10/2009 | Schlicht et al. |
| 2009/0258671 A1 | 10/2009 | Kekki et al. |
| 2009/0274096 A1 | 11/2009 | Fu |
| 2009/0323608 A1 | 12/2009 | Adachi et al. |
| 2010/0015923 A1* | 1/2010 | Golitschek ............ H04L 1/0026 455/67.7 |
| 2010/0061496 A1 | 3/2010 | Black et al. |
| 2010/0124940 A1 | 5/2010 | Hassan et al. |
| 2010/0157910 A1 | 6/2010 | Nentwig et al. |
| 2010/0159859 A1 | 6/2010 | Rofougaran |
| 2010/0167741 A1 | 7/2010 | Lee |
| 2010/0195618 A1 | 8/2010 | Park et al. |
| 2010/0195619 A1 | 8/2010 | Bonneville et al. |
| 2010/0195668 A1 | 8/2010 | Robert et al. |
| 2010/0214031 A1 | 8/2010 | Yamamoto et al. |
| 2010/0222060 A1 | 9/2010 | Zhang et al. |
| 2010/0234040 A1 | 9/2010 | Palanki et al. |
| 2010/0240356 A1 | 9/2010 | Lee et al. |
| 2010/0246480 A1* | 9/2010 | Aggarwal et al. ............ 370/328 |
| 2010/0255849 A1 | 10/2010 | Ore |
| 2010/0260105 A1 | 10/2010 | Keller et al. |
| 2010/0279691 A1 | 11/2010 | Dwyer et al. |
| 2010/0303039 A1 | 12/2010 | Zhang et al. |
| 2010/0322109 A1 | 12/2010 | Ahn et al. |
| 2010/0322119 A1 | 12/2010 | Li et al. |
| 2010/0323622 A1* | 12/2010 | Nentwig ....................... 455/63.1 |
| 2011/0013530 A1* | 1/2011 | Rinne et al. .................. 370/252 |
| 2011/0013550 A1 | 1/2011 | Wu |
| 2011/0013578 A1 | 1/2011 | Shimizu et al. |
| 2011/0019556 A1 | 1/2011 | Hsin et al. |
| 2011/0021216 A1 | 1/2011 | Pudney et al. |
| 2011/0064162 A1 | 3/2011 | McCallister et al. |
| 2011/0066429 A1* | 3/2011 | Shperling ............... G10L 25/78 704/228 |
| 2011/0080893 A1 | 4/2011 | Fong et al. |
| 2011/0085497 A1 | 4/2011 | Fang et al. |
| 2011/0086657 A1 | 4/2011 | Koivisto et al. |
| 2011/0103243 A1 | 5/2011 | Larsson et al. |
| 2011/0103330 A1 | 5/2011 | Montojo et al. |
| 2011/0128922 A1 | 6/2011 | Chen et al. |
| 2011/0134831 A1 | 6/2011 | Pirskanen |
| 2011/0149853 A1 | 6/2011 | Olsson et al. |
| 2011/0151913 A1 | 6/2011 | Forster et al. |
| 2011/0164707 A1 | 7/2011 | Luo et al. |
| 2011/0205976 A1 | 8/2011 | Roessel et al. |
| 2011/0217980 A1 | 9/2011 | Faurie et al. |
| 2011/0244870 A1 | 10/2011 | Lee |
| 2011/0267978 A1 | 11/2011 | Etemad |
| 2011/0268045 A1 | 11/2011 | Heo et al. |
| 2011/0269453 A1 | 11/2011 | Ranta-Aho et al. |
| 2011/0276701 A1 | 11/2011 | Purnadi et al. |
| 2011/0310835 A1 | 12/2011 | Cho et al. |
| 2012/0002643 A1 | 1/2012 | Chung et al. |
| 2012/0015656 A1 | 1/2012 | Tiwari |

(56) References Cited

U.S. PATENT DOCUMENTS

| | | |
|---|---|---|
| 2012/0044844 A1 | 2/2012 | Trainin |
| 2012/0063421 A1 | 3/2012 | Wu |
| 2012/0102162 A1 | 4/2012 | Devireddy |
| 2012/0113982 A1 | 5/2012 | Akselin et al. |
| 2012/0120789 A1 | 5/2012 | Ramachandran et al. |
| 2012/0140743 A1 | 6/2012 | Pelletier et al. |
| 2012/0142367 A1 | 6/2012 | Przybylski |
| 2012/0149377 A1 | 6/2012 | Su et al. |
| 2012/0157101 A1 | 6/2012 | Uemura et al. |
| 2012/0163249 A1 | 6/2012 | Chin et al. |
| 2012/0165019 A1 | 6/2012 | Shintani et al. |
| 2012/0195209 A1* | 8/2012 | Jain et al. ............... 370/252 |
| 2012/0202501 A1 | 8/2012 | Morioka et al. |
| 2013/0017805 A1 | 1/2013 | Andre-Joensson et al. |
| 2013/0044613 A1 | 2/2013 | Edara et al. |
| 2013/0083778 A1 | 4/2013 | Wang |
| 2013/0084870 A1 | 4/2013 | Nylander et al. |
| 2013/0114415 A1 | 5/2013 | Das et al. |
| 2013/0114433 A1 | 5/2013 | Park et al. |
| 2013/0114436 A1 | 5/2013 | Dural et al. |
| 2013/0114473 A1 | 5/2013 | Awoniyi et al. |
| 2013/0114566 A1 | 5/2013 | Awoniyi et al. |
| 2013/0114571 A1 | 5/2013 | Das et al. |
| 2013/0115967 A1 | 5/2013 | Soliman et al. |
| 2013/0115991 A1 | 5/2013 | Awoniyi et al. |
| 2013/0115994 A1 | 5/2013 | Awoniyi et al. |
| 2013/0121265 A1 | 5/2013 | Awoniyi et al. |
| 2013/0122921 A1 | 5/2013 | Juppi et al. |
| 2013/0148520 A1 | 6/2013 | Das et al. |
| 2013/0148527 A1 | 6/2013 | Awiniyi et al. |
| 2013/0148579 A1 | 6/2013 | Das et al. |
| 2013/0148627 A1 | 6/2013 | Das et al. |
| 2013/0148628 A1 | 6/2013 | Das et al. |
| 2013/0148629 A1 | 6/2013 | Das et al. |
| 2013/0150045 A1 | 6/2013 | Das et al. |
| 2013/0176952 A1* | 7/2013 | Shin et al. ............... 370/329 |
| 2013/0182655 A1 | 7/2013 | Das et al. |
| 2013/0329670 A1 | 12/2013 | Tang et al. |
| 2014/0010170 A1 | 1/2014 | Das et al. |
| 2014/0044431 A1* | 2/2014 | Hussain et al. ............ 398/79 |
| 2014/0206350 A1* | 7/2014 | Rinne et al. ............ 455/434 |
| 2016/0337907 A1 | 11/2016 | Awoniyi |

FOREIGN PATENT DOCUMENTS

| | | |
|---|---|---|
| CN | 1998171 A | 7/2007 |
| CN | 101052216 A | 10/2007 |
| CN | 101296139 A | 10/2008 |
| CN | 101299755 A | 11/2008 |
| CN | 101426292 A | 5/2009 |
| CN | 10199864 A | 3/2011 |
| CN | 101990211 A | 3/2011 |
| EP | 1213868 A1 | 6/2002 |
| EP | 1816666 A1 | 8/2007 |
| EP | 1993237 A2 | 11/2008 |
| EP | 2317816 A1 | 5/2011 |
| EP | 2385653 A2 | 11/2011 |
| EP | 2493257 A1 | 8/2012 |
| GB | 2386506 A | 9/2003 |
| GB | 2421880 A | 7/2006 |
| JP | 8065731 A | 3/1996 |
| JP | H08288884 A | 11/1996 |
| JP | H10511818 A | 11/1998 |
| JP | 2002330467 A | 11/2002 |
| JP | 2002344965 A | 11/2002 |
| JP | 2003051849 A | 2/2003 |
| JP | 2003264524 A | 9/2003 |
| JP | 2004173019 A | 6/2004 |
| JP | 2004228927 A | 8/2004 |
| JP | 2004350259 A | 12/2004 |
| JP | 2006094005 A | 4/2006 |
| JP | 2006515119 A | 5/2006 |
| JP | 2006303739 A | 11/2006 |
| JP | 2007074737 A | 3/2007 |
| JP | 2008543222 A | 11/2008 |
| JP | 2008300989 A | 12/2008 |
| JP | 2009060601 A | 3/2009 |
| JP | 2009218638 A | 9/2009 |
| JP | 2009532965 A | 9/2009 |
| JP | 2009545227 A | 12/2009 |
| JP | 2010011397 A | 1/2010 |
| JP | 2010011506 A | 1/2010 |
| JP | 2010522500 A | 7/2010 |
| JP | 2010226247 A | 10/2010 |
| JP | 2010273318 A | 12/2010 |
| JP | 2011097443 A | 5/2011 |
| JP | 2011521507 A | 7/2011 |
| JP | 2011176687 A | 9/2011 |
| JP | 2012015992 A | 1/2012 |
| JP | 2012525723 A | 10/2012 |
| JP | 2013509055 A | 3/2013 |
| JP | 2013516859 A | 5/2013 |
| JP | 2013524607 A | 6/2013 |
| KR | 20070049091 A | 5/2007 |
| KR | 20070058683 A | 6/2007 |
| KR | 20080034857 A | 4/2008 |
| KR | 20080106092 A | 12/2008 |
| KR | 20090015857 A | 2/2009 |
| KR | 20110067655 A | 6/2011 |
| WO | 9610320 A2 | 4/1996 |
| WO | 9900911 A1 | 1/1999 |
| WO | 0120942 A1 | 3/2001 |
| WO | 03034645 A1 | 4/2003 |
| WO | 03092212 A1 | 11/2003 |
| WO | 2004077712 A1 | 9/2004 |
| WO | 35096538 | 10/2005 |
| WO | 2005112566 A2 | 12/2005 |
| WO | WO-2006046307 A1 | 5/2006 |
| WO | 2006110875 A | 10/2006 |
| WO | 2006125149 A2 | 11/2006 |
| WO | 2006132778 A2 | 12/2006 |
| WO | 2007024748 A2 | 3/2007 |
| WO | 07050921 | 5/2007 |
| WO | 2007113319 A1 | 10/2007 |
| WO | 2007148911 A1 | 12/2007 |
| WO | 2008015512 A2 | 2/2008 |
| WO | 2008015512 A3 | 5/2008 |
| WO | 2008118429 A1 | 10/2008 |
| WO | 2008133453 A1 | 11/2008 |
| WO | WO-2009124377 A1 | 10/2009 |
| WO | 2010105232 A1 | 9/2010 |
| WO | WO-2010126418 A1 | 11/2010 |
| WO | 2010141607 | 12/2010 |
| WO | 2010150767 A1 | 12/2010 |
| WO | 2011047619 A1 | 4/2011 |
| WO | 2011053974 | 5/2011 |
| WO | 2011082545 A1 | 7/2011 |
| WO | 2011121175 | 10/2011 |
| WO | 2013070733 A1 | 5/2013 |
| WO | WO-2013070710 A2 | 5/2013 |
| WO | WO-2013070738 A1 | 5/2013 |
| WO | WO-2013070751 A1 | 5/2013 |

OTHER PUBLICATIONS

3GPP TS 34.108 V9.6.0 (Sep. 2011), 3rd Generation Partnership Project; Technical Specification Group Radio Access Network; Common test environments for User Equipment (UE); Conformance testing (Release 9).

3GPP TS 23.009 V11.0.0 (Sep. 2011), 3rd Generation Partnership Project; Technical Specification Group Core Network and Terminals; Handover procedures (Release 11).

3GPP TS 25.331 v11.0.0 (Dec. 2011), 3rd Generation Partnership Project; Technical Specification Group Radio Access Network; Radio Resource Control (RRC); Protocol specification (Release 11).

3GPP TS 25.413 V10.5.0 (Mar. 2012), 3rd Generation Partnership Project; Technical Specification Group Radio Access Network; UTRAN Iu interface, Radio Access Network Application Part (RANAP) signalling (Release 10).

"3rd Generation Partnership Project; Technical Specification Group Radio Access Network; Evolved Universal Terrestrial Radio Access (E-UTRA) and Evolved Universal Terrestrial Radio Access Net-

(56) References Cited

OTHER PUBLICATIONS work (E-UTRAN); Overall description; Stage 2 (Release 10)", 3GPP Standard; 3GPP TS 36.300, 3rd Generation Partnership Project (3GPP), Mobile Competence Centre ; 650, Route Des Lucioles ; F-06921 Sophia-Antipolis Cedex; France, vol. RAN WG2, No. V10.5.0, Sep. 28, 2011 (Sep. 28, 2011), pp. 1-194.
"3rd Generation Partnership Project; Technical Specification Group Services and System Aspects; Circuit Switched (CS) fallback, in Evolved Packet System (EPS); Stage 2 (Release 10)", 3GPP Standard; 3GPP TS 23.272, 3rd Generation Partnership Project (3GPP), Mobile Competence Centre ; 650, Route Des Lucioles ; F-06921 Sophiaantipolis Cedex ; France, vol. SA WG2, No. V10.5.0, Aug. 24, 2011 (Aug. 24, 2011), pp. 1-79, XP050553745, [retrieved on Aug. 24, 2011].
"3rd Generation Partnership Project; Technical Specification Group Services and System Aspects; Single Radio Voice Call Continuity (SRVCC); Stage 2 (Release 11)", 3GPP Standard; 3GPP TS 23.216, 3rd Generation Partnership Project (3GPP), Mobile Competence Centre ; 650, Route Des Lucioles ; F-06921 Sophiaantipolis Cedex ; France, vol. SA WG2; No. V11.2.0, Aug. 24, 2011 (Aug. 24, 2011), pp. 1-53. XP050553738, [retrieved on Aug. 24, 2011].
Abeta S., "Toward LTE commercial launch and future plan for LTE enhancements (LTE-Advanced)", Communication Systems (ICCS), 2010 IEEE International Conference on, IEEE, Piscataway, NJ, USA, Nov. 17, 2010 (Nov. 17, 2010), pp. 146-150, XP031848276, ISBN: 978-1-4244-7004-4.
Black, et al., "Interference Cancellation Techniques for CDMA2000 1x Reverse Link", IEEE Globecom 2009, Global Telecommunications Conference, 2009, 5 pages.
Ericsson: "LTE Spurious emission concept for flexible bandwidth", 3GPP Draft; R4-051130, 3rd Generation Partnership Project (3GPP), Mobile Competence Centre, 650, Route Des Lucioles; F-06921 Sophia-Antipolis Cedex; France, vol. RAN WG4, no. Seoul, Korea; Nov. 3, 2005, Nov 3, 2005.
Gessner C., et al., "Voice and SMS in LTE White Paper," Rohde & Schwarz GmbH & Co. KG, 2011, <URL: http://www2.rohde-schwarz.com/file_15903/1MA197_1e.pdf>pp. 1-45.
Holma, H., et al., "WCDMA for UMTS—HSPA Evolution and LTE (4th Edition)" "WCDMA for UMTS—HSPA Evolution and LTE (4th Edition)", Jan. 1, 2007 (Jan. 1, 2007), John Wiley & Sons Ltd., UK, XP055052236, ISBN: 978-0-47-031933-8 , pp. 74-75.
International Search Report and Written Opinion—PCT/US2012/063895—ISA/EPO—May 13, 2013.
International Search Report and Written Opinion—PCT/US2012/063903—ISA/EPO—Mar. 22, 2013.
Qunhui C., "Evolution and deployment of VoLTE", Huawei Communicate, Sep. 1, 2011 (Sep. 1, 2011), XP055052291, pp. 52-55.
Samsung: "FDD/TDD dual mode UE capability handling", 3GPP Draft; 36331_CRXXXX_(REL-10)_R2-116035 FDD TDD Dual Mode UE, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; 20111114-20111119, Nov. 7, 2011 (Nov. 7, 2011), XP050564131, [retrieved on Nov. 7, 2011].
"Understanding CS Fallback in LTE", Sep. 27, 2009 (Sep. 27, 2009), XP055052327.
ZTE: "Discussion on activation and deactivation", 3GPP Draft; R2-103719, 3rd Generation Partnership Project (3GPP), Mobile Competence Centre ; 650, Route Des Lucioles ; F-06921 Sophia-Antipolis Cedex ; France, vol. Ran WG2, No. Stockholm, Sweden; 20100628, Jun. 22, 2010 (Jun. 22, 2010), XP050451195, [retrieved on Jun. 22, 2010].
Co-pending U.S. Appl. No. 14/091,933, filed Nov. 27, 2013.
Co-pending U.S. Appl. No. 13/707,111, filed Dec. 6, 2012.
3GPP TS 36.304, "3rd Generation Partnership Project; Technical Specification Group Radio Access Network; Evolved Universal Terrestrial Radio Access (E-UTRA); User Equipment (UE) procedures in idle mode (Release 10)", 3GPP Standard; 3GPP TS 36.304, 3rd Generation Partnership Project (3GPP), Mobile Competence Centre ; 650, Route Des Lucioles ; F-06921 Sophia-Antipolis Cedex ; France, vol. RAN WG2, No. V10.3.0, Sep. 28, 2011 (Sep. 28, 2011), pp. 1-33, XP050554208, [retrieved on Sep. 28, 2011].
3GPP TS 36.331, "3rd Generation Partnership Project; Technical Specification Group Radio Access Network; Evolved Universal Terrestrial Radio Access (E-UTRA); Radio Resource Control (RRC); Protocol specificatin (Release 10)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, vol. RAN WG2, No. V10.3.0, Sep. 30, 2011 (Sep. 30, 2011), pp. 1-296, XP050554294, [retrieved on Nov. 30, 2011].
3GPPTS 36.101, "3rd Generation Partnership Project; Technical Specification Group Radio Access Network; Evolved Universal Terrestrial Radio Access (E-UTRA); User Equipment (UE) radio transmission and reception (Release 10)", 3GPP Standard; 3GPP TS 36.101, 3rd Generation Partnership Project (3GPP), Mobile Competence Centre ; 650, Route Des Lucioles; F-06921 Sophia-Antipolis Cedex ; France, vol. RAN WG4, No. V10.4.0, Oct. 3, 2011 (Oct. 3, 2011), pp. 1-242, XP050554352, [retrieved on Oct. 3, 2011].
Co-Pending U.S. Appl. No. 13/363,538, filed Feb. 1, 2012.
Huawei, "R2-084311: Scaling measurement and cell reselection parameters," 3GPP TSG RAN WG2 #63 [Online] 2008, pp. 1-8.
International Search Report and Written Opinion—PCT/US2012/063877—ISA/EPO—Apr. 2, 2013.
International Search Report and Written Opinion—PCT/US2012/063880—ISA/EPO—Jun. 6, 2013.
International Search Report and Written Opinion—PCT/US2012/063886—ISA/EPO—Mar. 26, 2013.
International Search Report and Written Opinion—PCT/US2012/063907—ISA/EPO—Mar. 19, 2013.
International Search Report and Written Opinion—PCT/US2012/063912—ISA/EPO—Mar. 12, 2013.
International Search Report and Written Opinion—PCT/US2012/063916—ISA/EPO—Mar. 20, 2013.
Li, et al., "Mobility management: from GPRS to UMTS," Wireless Communications and Mbile Cmputing, 2001, pp. 339-359.
NEC Group: "Framework to define additional carrier type: Carrier segments", R1-113227, 3RD Generation Partnership Project (3GPP), Mobile Competence Centre ; 650, Route Des Lucioles ; F-06921 Sophia-Antipolis Cedex ; France, vol. RAN WG1, no. Zhuhai; Oct. 4, 2011 (Oct. 4, 2011),XP050538345.
R2-073069: E-UTRA Cell Selection and Cell Reselection Aspects. 3GPP TSG-RAN WG2 Meeting #59 [Online] 2007, pp. 1-11.
3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Standard; 3GPP TR 36.806, 3rd Generation Partnership Project (3GPP), Mobile Competence Centre; 650, Route Des Lucioles; F-06921 Sophia-Antipolis Cedex; France, No. V9.0.0, Apr. 21, 2010 (Apr. 21, 2010), pp. 1-34, XP050402561, [retrieved on Apr. 21, 2010].
Arjona A., et al., "Live network Performance Challenge Flash-OFDM Vs HSDPA," 22nd International Conference on Advanced Information Networking and Applications, 2008, pp. 918-925.
IEEE Std 802.11tm-2007: "IEEE Standard for Information Technology—Telecommunications and Information exchange between systems—Local and metropolitan area networks—Specific requirements Part 11: Wireless LAN Medium Access Control (MAC) and Physical Layer (PHY) Specifications," 2007, pp. 1-98.
Klerer M., "Introduction to IEEE 802.20," Technical and Procedural Orientation, IEEE 802.20-PD-04, Mar. 10, 2003.
Marks R.B., "The IEEE 802.16 Wireless MAN Standard for Broadband Wireless Metropolitan Area Networks," Apr. 16, 2003.
Qualcomm Incorporated: "Flexible Bandwidth Usage for UMTS FDD", 3GPP Draft; R1-125194 Flexible Bandwidth Usage UMTS_FDD, 3rd Generation Partnership Project—(3GPP), Mobile Competence Centre ; 650, Route Des Lucioles ; F-06921 Sophia-Antipolis Cedex ; France vol. RAN WG1, no. New Orleans, USA; Nov. 12-16, 2012 Nov. 3, 2012 (Nov. 3, 2012), XP0506630307, Retrieved from the Internet: URL:http://www.3gpp.org/ftp/tsgran/WG1RL1/TSGR1_71/Docs/.

(56) References Cited

OTHER PUBLICATIONS

QUALCOMM Incorporated, "Use Cases for Extension Carriers," 3GPP TSG-RAN WG1 #66bis, R1-113382, Oct. 2011, pp. 1-3, URL,http://www.3gpp.org/ftp/tsg_ran/WG1_RL1/TSGR1_66b/Docs/R1-113382.zip.

ZTE: "Introduction of Additional Carrier Types", 3GPP TSG-RAN WG1 Meeting #66 R1-112248, URL: http://www.3gpp.org/ftp/tsg_ran/WG1_RL1/TSGR1_66b/Docs/R1-112248.zip, Aug. 16, 2011, pp. 1-4.

"3rd Generation Partnership Project, Technical Specification Group Radio Access Network, Evolved Universal Terrestrial Radio Access (E-UTRA) and Evolved Universal Terrestrial Radio Access Network (E-UTRAN), Overall Description, Stage 2 (Release 10)", 3GPP Standard, 3GPP TS 136.300, 3rd Generation Partnership Project (3gpp), Mobile Competence Centre, 650, Route Des Lucioles, F-06921 Sophia-Antipolis Cedex, France, val. RAN WG2, No. V10.4.0, Jun. 22, 2011, XP050553479, pp. 1-194.

"3rd Generation Partnership Project; Technical Specification Group Radio Access Network; Evolved Universal Terrestrial Radio Access (E-UTRA), Radio Resource Control (RRC), Protocol specification (Release 10)", 3GPP Standard, 3GPP TS 136.331, 3rd Generation Partnership Project (3gpp), Mobile Competence Centre, 650, Route Des Lucioles, F-06921 Sophia-Antipolis Cedex, France, vol. RAN WG2, No. V10.2.0, Jun. 24, 2011, XP050553577, pp. 1-298.

* cited by examiner

| N | $SF_{UL,DPDCH}$ ($SF_{DL,DPCH}$) | $C_{UL,DPDCH}$ or $C_{DL,DPCH}$ per 20 ms | $C_{UL,DPDCH}$ or $C_{DL,DPCH}$ per slot | RM tuning method compared to normal mode |
|---|---|---|---|---|
| 1 | 64 (128) | 1200 | 40 | Same |
| 2 | 32 (64) | 1200 | 80 | Same |
| 3 | 32 (64) | 800 | 80 | More puncturing |
|   | 16 (32) | 1600 | 160 | More repetition |
| 4 | 16 (32) | 1200 | 160 | Same |
| 5 | 16 (32) | 960 | 160 | More puncturing |
|   | 8 (16) | 1920 | 320 | More repetition |
| 6 | 16 (32) | 800 | 160 | More puncturing |
|   | 8 (16) | 1600 | 320 | More repetition |
| 8 | 8 (16) | 1200 | 320 | Same |

FIG. 5A 500-b

| N | Spreading factor | $N_{pilot}$ per slot | $N_{TPC}$ per slot | $N_{TFCI}$ per slot | Number of slots per 20 ms | Total number of TFCI bits per 20 ms |
|---|---|---|---|---|---|---|
| 1 | 256 | 6 | 2 | 2 | 30 | 60 |
| 2 | 128 | 12 | 4 | 4 | 15 | 60 |
| 3 | 128 | 12 | 4 | 4 | 10 | 40 |
|   | 64 | 24 | 8 | 8 | 10 | 80 |
| 4 | 64 | 24 | 8 | 8 | 7.5 | 60 |
| 5 | 64 | 24 | 8 | 8 | 6 | 48 |
|   | 32 | 48 | 16 | 16 | 6 | 96 |
| 6 | 64 | 24 | 8 | 8 | 5 | 40 |
|   | 32 | 48 | 16 | 16 | 5 | 80 |
| 8 | 32 | 48 | 16 | 16 | 3.75 | 60 |

FIG. 5B 500-c

| N | Spreading factor | $N_{TPC}$ per slot | $N_{TFCI}$ per slot | $N_{pilot}$ per slot |
|---|---|---|---|---|
| 1 | 128 | 2 | 0 | 4 |
| 2 | 64 | 4 | 0 | 8 |
| 3 | 64 | 4 | 0 | 8 |
|   | 32 | 8 | 0 | 16 |
| 4 | 32 | 8 | 0 | 16 |
| 5 | 32 | 8 | 0 | 16 |
|   | 16 | 16 | 0 | 32 |
| 6 | 32 | 8 | 0 | 16 |
|   | 16 | 16 | 0 | 32 |
| 8 | 16 | 16 | 0 | 32 |

FIG. 5C

| N | Maximum latency $10ms \times N$ Frame Boundary Approach | Maximum latency Slot Boundary Approach |
|---|---|---|
| 1 | 10 ms | N/A |
| 2 | 20 ms | 1.33 ms |
| 3 | 30 ms | 2 ms |
| 4 | 40 ms | 5.33 ms |
| 5 | 50 ms | 3.33 ms |
| 6 | 60 ms | 4 ms |
| 8 | 80 ms | 10.67 ms |

| N | $C_{UL,DPDCH}$ or $C_{DL,DPCH}$ per 20 ms | $SF_{UL,DPDCH}$ ($SF_{DL,DPCH}$) | Class A, B, C Code Rates | RM tuning method compared to normal mode |
|---|---|---|---|---|
| 1 | 1200 | 64 (128) | 1/3, 1/3, 1/2 | Same |
| 2 | 600 | 64 (128) | 1/2, ½, ½<br>1/2, ½, 1 | More puncturing |
| 2 | 1200 | 32 (64) | 1/2, ½, ½<br>1/2, ½, 1 | More repetition |

FIG. 9

| N | $C_{UL,DPDCH}$ or $C_{DL,DPCH}$ per 20 ms | $SF_{UL,DPDCH}$ ($SF_{DL,DPCH}$) | Modulation | RM tuning method compared to normal mode |
|---|---|---|---|---|
| 1 | 1200 | 64 (128) | QPSK | Same |
| 2 | 1200 | 64 (128) | 16-QAM | Same |
| 3 | 1200 | 64 (128) | 64-QAM | Same |

FIG. 11

VOICE SERVICE SOLUTIONS FOR FLEXIBLE BANDWIDTH SYSTEMS

CROSS-RELATED APPLICATIONS

The present application for patent claims priority to Provisional Application No. 61/556,777 entitled "FRACTIONAL SYSTEMS IN WIRELESS COMMUNICATIONS" filed Nov. 7, 2011, and assigned to the assignee hereof and hereby expressly incorporated by reference herein for all purposes. The present application for patent also claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein for all purposes. The present application for patent also claims priority to Provisional Application No. 61/621,177 entitled "VOICE SERVICE SOLUTIONS FOR FLEXIBLE BANDWIDTH SYSTEMS" filed Apr. 6, 2012, and assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally increased, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. This may provide a partial solution to the problem. Flexible bandwidth systems may provide another solution to these problems. However, some types of voice service and other interactive applications may be delay sensitive, and it may be desirable to provide certain data rates and/or a certain quality of service without retransmission of lost data when utilizing flexible bandwidth systems.

SUMMARY

Methods, systems, and devices are provided for utilizing flexible bandwidth systems with services, such as voice services. For example, the scaling of one or more aspects of the flexible bandwidth system that may be providing a service, such as a voice service, may be compensated for through altering one or more aspects within a code domain. The tools and techniques may include scaling spreading factors (with rate matching tuning in some embodiments), multi-code transmission, code rate increases, AMR codec rate adjustments, and/or higher order modulation. Subframe decoding approaches for the reception scheme may also be utilized. These tools and techniques may be flexibly implemented on mobile devices and/or base stations. Some embodiments may also minimize the latency introduced by the transmission and/or reception process.

Flexible bandwidths systems may involve wireless communications systems that may utilize portions of spectrum that may not be big enough to fit a normal waveform utilizing flexible waveforms. A flexible bandwidth system may be generated with respect to a normal carrier bandwidth system through dilating, or scaling down, the time or the chip rate of the flexible bandwidth system with respect to the normal carrier bandwidth system. Some embodiments increase the bandwidth of a flexible waveform through expanding, or scaling up, the time or the chip rate of the flexible carrier bandwidth system.

Some embodiments include a method for providing a service, such as a voice service, over a flexible bandwidth system. The method may include: identifying a scaling factor of the flexible bandwidth system; scaling one or more aspects of the flexible bandwidth system based on the scaling factor; and/or compensating for the scaling of the one or more aspects of the flexible bandwidth system through altering one or more aspects within a code domain.

Compensating for the scaling of the one or more aspects of the flexible bandwidth system through altering one or more aspects within the code domain may include: identifying a spreading factor; and/or adjusting the spreading factor utilizing the scaling factor to generate an adjusted spreading factor. Some embodiments include applying rate tuning matching through at least a puncturing process or a repetition process. Some embodiments include increasing a transmission power to compensate at least for the adjusted spreading factor or a slower power control.

Compensating for the scaling of the one or more aspects of the flexible bandwidth system through altering one or more aspects within the code domain may include: receiving a voice frame from a MAC layer; determining one or more slot boundaries with respect to a one or more normal frame boundaries at a PHY layer; and/or transmitting the voice frame at one of the one or more slot time boundaries. Transmitting the voice frame at one of the one or more slot time boundaries may include delaying transmitting the voice frame by a period of time; the period of time may include an additional slot time boundary.

Compensating for the scaling of the one or more aspects of the flexible bandwidth system through altering one or more aspects within the code domain may include identifying a voice frame; segmenting the voice frame into a plurality of sub-blocks based on the scaling factor; and/or transmitting the plurality of sub-blocks simultaneously over a plurality of channels. In some embodiments, a cardinality of the plurality of channels equals the scaling factor. In some embodiments, a cardinality of the plurality of channels exceeds the scaling factor.

Compensating for the scaling of the one or more aspects of the flexible bandwidth system through altering one or more aspects within the code domain may include adjusting a code rate to maintain a data rate affected by the scaling of the one or more aspects of the flexible bandwidth system.

Compensating for the scaling of the one or more aspects of the flexible bandwidth system through altering one or more aspects within the code domain may include adjusting a modulation scheme to maintain a data rate affected by the scaling of the one or more aspects of the flexible bandwidth system. Compensating for the scaling of the one or more aspects of the flexible bandwidth system through altering one or more aspects within the code domain may include utilizing an subframe decoding scheme to at least demodulate or decode a received voice frame. Compensating for the scaling of the one or more aspects of the flexible bandwidth system through altering one or more aspects within the code domain may include adjusting an AMR codec rate based on the scaling factor.

Some embodiments include a wireless communications system configured for providing a service over a flexible bandwidth system. The service may include a voice service. The system may include: means for identifying a scaling factor of the flexible bandwidth system; means for scaling one or more aspects of the flexible bandwidth system based on the scaling factor; and/or means for compensating for the scaling of the one or more aspects of the flexible bandwidth system through altering one or more aspects within a code domain.

The means for compensating for the scaling of the one or more aspects of the flexible bandwidth system through altering one or more aspects within the code domain may include: means for identifying a spreading factor; and/or means for adjusting the spreading factor utilizing the scaling factor to generate an adjusted spreading factor. Some embodiments include means for applying rate tuning matching through at least a puncturing process or a repetition process. Some embodiments include means for increasing a transmission power to compensate for at least the adjusted spreading factor or slower power control.

The means for compensating for the scaling of the one or more aspects of the flexible bandwidth system through altering one or more aspects within the code domain may include: means for receiving a voice frame from a MAC layer; means for determining one or more slot boundaries with respect to a one or more normal frame boundaries at a PHY layer; and/or means for transmitting the voice frame at one of the one or more slot time boundaries. The means for transmitting the voice frame at one of the one or more slot time boundaries may include means for delaying transmitting the voice frame by a period of time; the period of time may include an additional slot time boundary.

The means for compensating for the scaling of the one or more aspects of the flexible bandwidth system through altering one or more aspects within the code domain may include: means for identifying a voice frame; means for segmenting the voice frame into a plurality of sub-blocks based on the scaling factor; and/or means for transmitting the plurality of sub-blocks simultaneously over a plurality of channels. In some embodiments, a cardinality of the plurality of channels equals the scaling factor. In some embodiments, a cardinality of the plurality of channels exceeds the scaling factor.

The means for compensating for the scaling of the one or more aspects of the flexible bandwidth system through altering one or more aspects within the code domain may include means for adjusting a code rate to maintain a data rate affected by the scaling of the one or more aspects of the flexible bandwidth system. The means for compensating for the scaling of the one or more aspects of the flexible bandwidth system through altering one or more aspects within the code domain may include means for adjusting a modulation scheme to maintain a data rate affected by the scaling of the one or more aspects of the flexible bandwidth system. The means for compensating for the scaling of the one or more aspects of the flexible bandwidth system through altering one or more aspects within the code domain may include means for utilizing a subframe decoding scheme to at least demodulate or decode a received voice frame. The means for compensating for the scaling of the one or more aspects of the flexible bandwidth system through altering one or more aspects within the code domain may include means for adjusting an AMR codec rate based on the scaling factor.

Some embodiments include a computer program product for providing a service over a flexible bandwidth system that may include a non-transitory computer-readable medium that may include: code for identifying a scaling factor of the flexible bandwidth system; code for scaling one or more aspects of the flexible bandwidth system based on the scaling factor; and/or code for compensating for the scaling of the one or more aspects of the flexible bandwidth system through altering one or more aspects within a code domain. The service may include a voice service. While the term "code" may refer to software code in these embodiments, other embodiments may utilize the term "code" to mean other things, such as spreading codes, merely by way of example.

The code for compensating for the scaling of the one or more aspects of the flexible bandwidth system through altering one or more aspects within the code domain may include: code for identifying a spreading factor; and/or code for adjusting the spreading factor utilizing the scaling factor to generate an adjusted spreading factor. The non-transitory computer medium may include code for applying rate tuning matching through at least a puncturing process or a repetition process. The non-transitory computer medium may include code for increasing a transmission power to compensate for at least the adjusted spreading factor or a slower power control.

The code for compensating for the scaling of the one or more aspects of the flexible bandwidth system through altering one or more aspects within the code domain may include: code for receiving a voice frame from a MAC layer; code for determining one or more slot boundaries with respect to a one or more normal frame boundaries at a PHY layer; and/or code for transmitting the voice frame at one of the one or more slot time boundaries. The code for transmitting the voice frame at one of the one or more slot time boundaries may include code for delaying transmitting the voice frame by a period of time; the period of time may include an additional slot time boundary.

The code for compensating for the scaling of the one or more aspects of the flexible bandwidth system through altering one or more aspects within the code domain may include: code for identifying a voice frame; code for segmenting the voice frame into a plurality of sub-blocks based on the scaling factor; and/or code for transmitting the plurality of sub-blocks simultaneously over a plurality of channels. In some embodiments, a cardinality of the plurality of channels equals the scaling factor. In some embodiments, a cardinality of the plurality of channels exceeds the scaling factor.

The code for compensating for the scaling of the one or more aspects of the flexible bandwidth system through altering one or more aspects within the code domain may include code for adjusting a code rate to maintain a data rate affected by the scaling of the one or more aspects of the flexible bandwidth system. The code for compensating for the scaling of the one or more aspects of the flexible bandwidth system through altering one or more aspects within the code domain may include code for adjusting a modulation scheme to maintain a data rate affected by the scaling of the one or more aspects of the flexible bandwidth system. The code for compensating for the scaling of the one or more aspects of the flexible bandwidth system through altering one or more aspects within the code domain may include code for utilizing an subframe decoding scheme to at least demodulate or decode a received voice frame. The code for compensating for the scaling of the one or more aspects of the flexible bandwidth system through altering one or more aspects within the code domain may include code for adjusting an AMR codec rate based on the scaling factor.

Some embodiments include a wireless communications device configured for providing a service over a flexible bandwidth system. The service may include a voice service. The device may include at least one processor configured to: identify a scaling factor of the flexible bandwidth system; scale one or more aspects of the flexible bandwidth system based on the scaling factor; and/or compensate for the scaling of the one or more aspects of the flexible bandwidth system through altering one or more aspects within a code domain. The device may include at least one memory coupled with the at least one processor.

The at least one processor configured to compensate for the scaling of the one or more aspects of the flexible bandwidth system through altering one or more aspects within the code domain may include a configuration to: identify a spreading factor; and/or adjust the spreading factor utilizing the scaling factor to generate an adjusted spreading factor. The at least one processor may be configured to apply rate tuning matching through at least a puncturing process or a repetition process. The at least one processor may be configured to increase a transmission power to compensate for at least the adjusted spreading factor or a slower power control.

The at least one processor configured to compensate for the scaling of the one or more aspects of the flexible bandwidth system through altering one or more aspects within the code domain include a configuration to: receive a voice frame from a MAC layer; determine one or more slot boundaries with respect to a one or more normal frame boundaries at a PHY layer; and/or transmit the voice frame at one of the one or more slot time boundaries. The at least one process configured to transmit the voice frame at one of the one or more slot time boundaries may be configured to delay transmitting the voice frame by a period of time; the period of time may include an additional slot time boundary.

The at least one processor configured to compensate for the scaling of the one or more aspects of the flexible bandwidth system through altering one or more aspects within the code domain may include a configuration to: identify a voice frame; segment the voice frame into a plurality of sub-blocks based on the scaling factor; and/or transmit the plurality of sub-blocks simultaneously over a plurality of channels. In some embodiments, a cardinality of the plurality of channels equals the scaling factor. In some embodiments, a cardinality of the plurality of channels exceeds the scaling factor.

The at least one processor configured to compensate for the scaling of the one or more aspects of the flexible bandwidth system through altering one or more aspects within the code domain may include a configuration to adjust a code rate to maintain a data rate affected by the scaling of the one or more aspects of the flexible bandwidth system. The at least one processor configured to compensate for the scaling of the one or more aspects of the flexible bandwidth system through altering one or more aspects within the code domain may include a configuration to adjust a modulation scheme to maintain a data rate affected by the scaling of the one or more aspects of the flexible bandwidth system. The at least one processor configured to compensate for the scaling of the one or more aspects of the flexible bandwidth system through altering one or more aspects within the code domain may include a configuration to utilize a subframe decoding scheme to at least demodulate or decode a received voice frame. The at least one processor configured to compensate for the scaling of the one or more aspects of the flexible bandwidth system through altering one or more aspects within the code domain may include a configuration to adjust an AMR codec rate based on the scaling factor.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 5A, 5B, and 5C show tables that includes adjusted spreading factors in accordance with various embodiments;

FIG. 6C shows a table comparing latency of different approaches in accordance with various embodiments;

FIG. 9 shows a table that includes examples of adjusting code rates in accordance with various embodiments;

FIG. 11 shows a table that illustrates the impact of modulation in a flexible bandwidth system in accordance with various embodiments;

DETAILED DESCRIPTION

Figure 1:
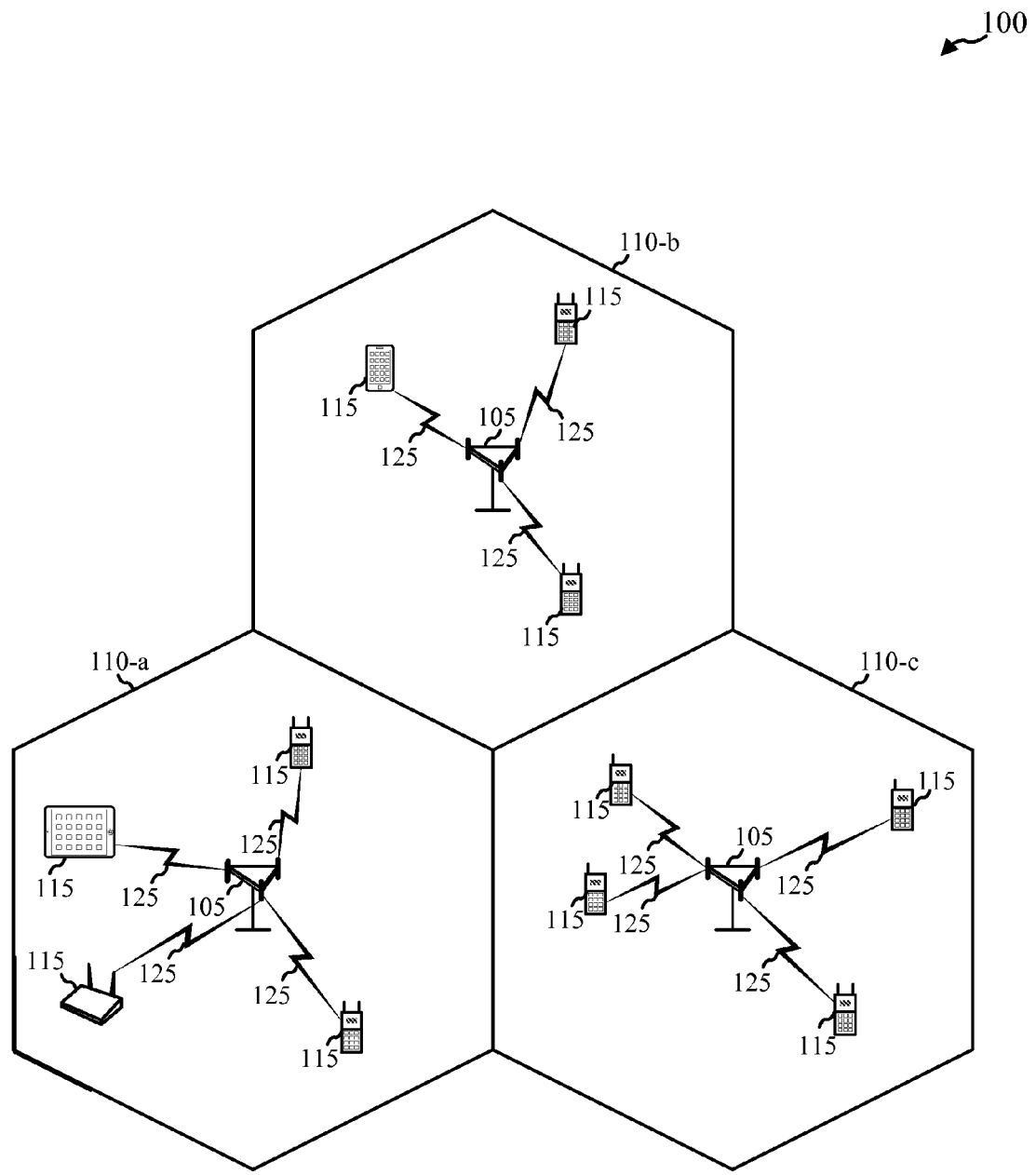
FIG. 1 shows a block diagram of a wireless communications system in accordance with various embodiments.

Methods, systems, and devices are provided for services, such as voice services, when utilizing flexible bandwidth systems. For example, the scaling of one or more aspects of the flexible bandwidth system that may be providing service, such as a voice service, may be compensated for through altering one or more aspects within a code domain. The specific techniques may include scaling spreading factors (with rate matching tuning in some embodiments), multi-code transmission, code rate increases, AMR codec rate adjustments, and/or higher order modulation. Subframe decoding approaches for the reception scheme may also be utilized. These tools and techniques can be flexibly implemented on the mobile device and/or base station side. Some embodiments may also reduce the latency introduced by the transmission and/or reception process.

Flexible bandwidths systems may involve wireless communications systems that may utilize portions of spectrum that may not be big enough to fit a normal waveform utilizing flexible waveforms. A flexible bandwidth system may be generated with respect to a normal carrier bandwidth system through dilating, or scaling down, the time or the chip rate of the flexible bandwidth system with respect to the normal bandwidth system. Some embodiments increase the bandwidth of a flexible waveform through expanding, or scaling up, the time or the chip rate of the flexible bandwidth system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink and/or reverse link transmission, from a mobile device 115 to a base station 105, and/or downlink and/or forward link transmissions, from a base station 105 to a mobile device 115. The transmissions 125 may include flexible and/or normal waveforms. Normal waveforms may also be referred to as legacy and/or normal waveforms.

The different aspects of system 100, such as the mobile devices 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the mobile devices 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain mobile devices 115 and/or base stations 105) that may be generated with respect to a normal subsystem (that may be implemented using other mobile devices 115 and/or base stations 105) through dilating, or scaling down, the time of the flexible subsystem with respect to the time of the normal subsystem.

In some embodiments, the different aspects of system 100, such as the mobile devices 115, the base stations 105, the core network 130, and/or the controller 120 may be configured for providing voice service over a flexible bandwidth system. In providing services, such as voice services, over the flexible bandwidth system, some of the mobile devices 115 and/or base stations 105 may need to compensate for the scaling of one or more aspects of the flexible bandwidth system. This may be achieved through altering one or more aspects with a code domain. For example, mobile devices 115 and/or base stations 105 may identify and/or adjust a spreading factor utilizing the scaling factor to generate an adjusted spreading factor to compensate for the scaling. Mobile devices 115 and/or base stations 105 may compensate for flexible bandwidth scaling utilizing other techniques including the use of multi-code transmissions, latency management, subframe decoding, adjusted code rates, and/or adjusted modulations schemes, as discussed in more detail below.

Some embodiments may include mobile devices and/or base stations that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a scaling factor. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interrupt rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
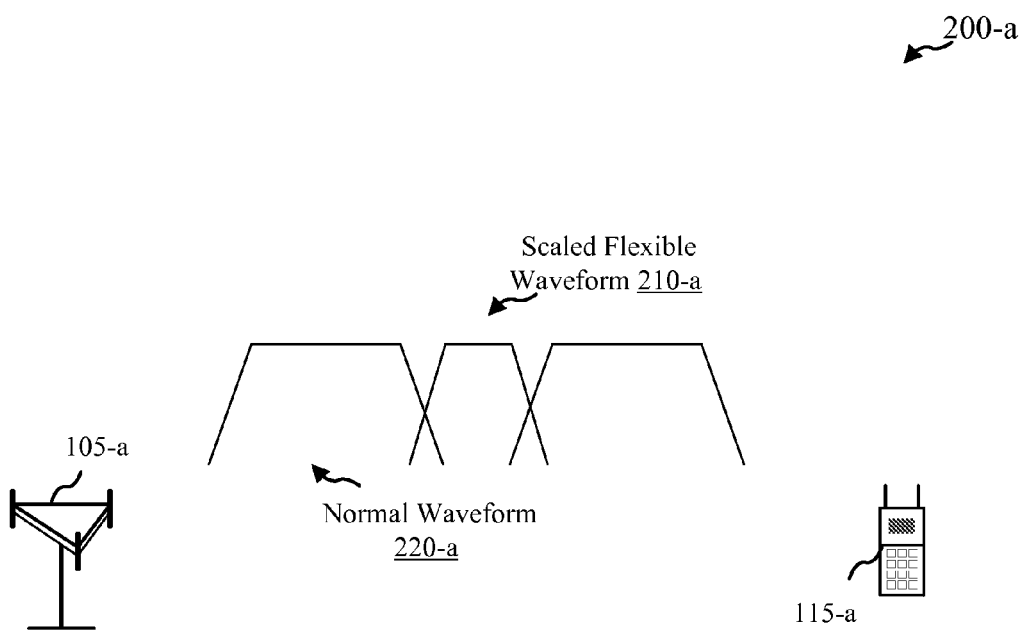
FIG. 2A shows an example of a wireless communications system where a flexible waveform fits into a portion of spectrum not broad enough to fit a normal waveform in accordance with various embodiments.

FIG. 2A shows an example of a wireless communications system 200-a with a base station 105-a and a mobile device 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the base station 105-a and/or the mobile device 115-a may transmit. In some cases, the normal waveform 220-a may completely overlap the flexible waveform 210-a. Some embodiments may also utilize multiple flexible waveforms 210. In some embodiments, another base station and/or mobile device (not shown) may transmit the normal waveform 220-a and/or the flexible waveform 210-a.

Figure 2B:
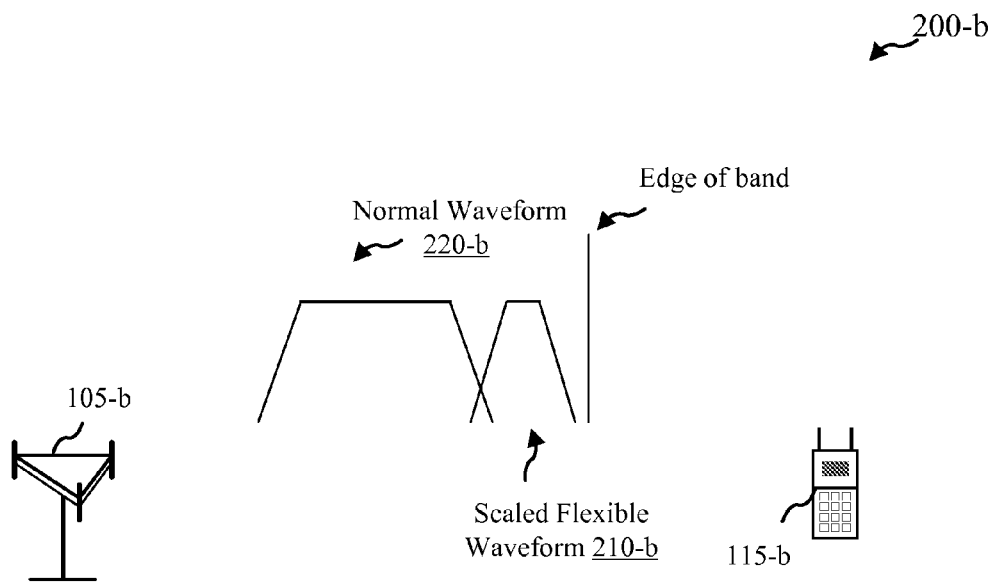
FIG. 2B shows an example of a wireless communications system where a flexible waveform fits into a portion of spectrum near an edge of a band in accordance with various embodiments.

In some embodiments, the mobile device 115-a and/or the base station 105-a may be configured to support voice services over a flexible bandwidth system. The mobile device 115-a and/or the base station 105-a may be configured to compensate for the scaling of one or more aspects of the flexible bandwidth system, such as the scaling of the scaled flexible waveform 210-a. This compensation may be achieved through altering one or more aspects with a code domain at the mobile device 115-a and/or the base station 105-a. For example, the mobile device 115-a and/or the base station 105-b may identify and/or adjust a spreading factor utilizing the scaling factor to generate an adjusted spreading factor to compensate for the scaling. The mobile device 115-a and/or the base station 105-a may compensate for flexible bandwidth scaling of the scaled flexible waveform 210 utilizing other techniques including the use of multi-code transmissions, latency management, subframe decoding, adjusted code rates, and/or adjusted modulations schemes, as discussed in more detail below. FIG. 2B shows an example of a wireless communications system 200-b with a base station 105-b and mobile device 115-b, where a flexible waveform 210-b fits into a portion of spectrum near an edge of a band, which may be a guard band, where normal waveform 220-b may not fit. System 200-b may be an example of system 100 of FIG. 1. Similar techniques for compensating for the scaling of the scaled flexible waveform 210-b may be applicable as discussed above.

Figure 3:
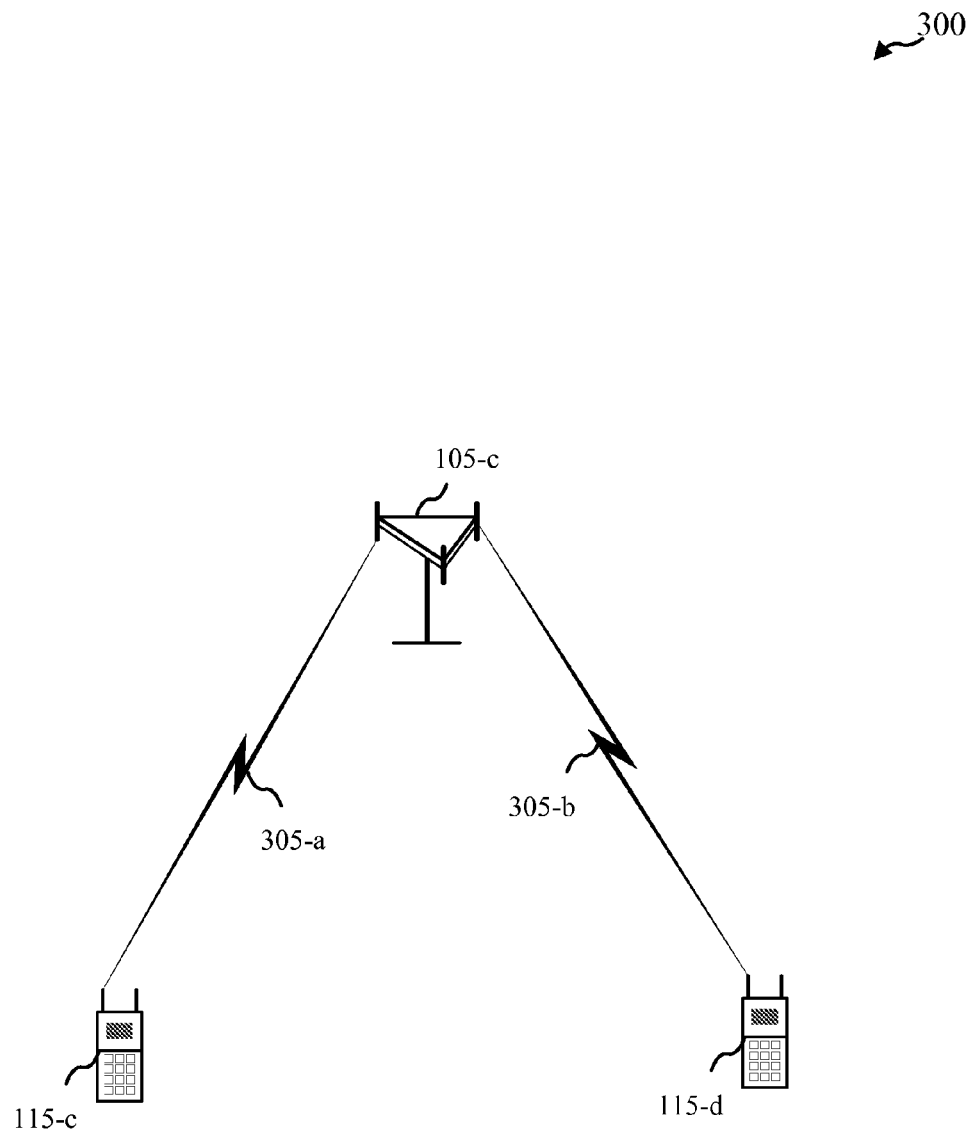
FIG. 3 shows a block diagram of a wireless communications system in accordance with various embodiments.

FIG. 3 shows a wireless communications system 300 with a base station 105-c and mobile devices 115-c and 115-d, in accordance with various embodiments. In some embodiments, the base station 105-c and/or the mobile devices 115-c/115-d may be configured for providing services, such as voice services, within a flexible bandwidth system. For example, transmissions 305-a and/or 305-b between the mobile device 115-c/115-d and the base station 105-c may involve transmissions that have been scaled utilizing flexible waveforms. The base station 105-c and/or the mobile devices 115-c/115-d may compensate for the scaling through altering one or more aspects within one or more code domains. For example, the base station 105-c and/or the mobile devices 115-c/115-d may identify a spreading factor. The spreading factor may be adjusted utilizing the scaling factor to generate an adjusted spreading factor at the base station 105-c and/or the mobile devices 115-c/115-d. In some embodiments, rate tuning matching is applied through at least a puncturing process or a repetition process as part of the spreading factor adjustment process.

In some embodiments, the base station 105-c and/or the mobile devices 115-c/115-d may compensate for the scaling of one or more aspects of the flexible bandwidth system, such as transmissions 305-a and/or 305-b, through one or more latency management techniques. For example, within the base station 105-c and/or mobile devices 115-c/115-d, a voice frame may be received from a MAC layer at a PHY layer. One or more slot boundaries may be determined at the base station 105-c and/or mobile devices 115-c/115-d with respect to one or more normal frame boundaries at a PHY layer. The voice frame may be transmitted, as transmissions 305-a and/or 305-b, at one of the one or more slot time boundaries from the base station 105-c and/or the mobile devices 115-c/115-d. In some embodiments, transmitting the voice frame at one of the one or more slot time boundaries further includes delaying transmitting the voice frame by an additional slot time boundary.

The base station 105-c and/or the mobile devices 115-c/115-d may compensate for the scaling of the one or more aspects of the flexible bandwidth system, such as transmissions 305-a and/or 305-b, through the use of multi-code transmission schemes. For example, the base station 105-c and/or the mobile devices 115-c/115-d may identify a voice frame. The voice frame may be segmented at the base station 105-c and/or the mobile devices 115-c/115-d into multiple sub-blocks based on the scaling factor. The multiple sub-blocks may be transmitted simultaneously over multiple channels from the base station 105-c and/or the mobile devices 115-c/115-d as part of transmissions 305-a and/or 305-b. The number, or cardinality, of channels may equal the scaling factor. The number, or cardinality, of the multiple channels may exceed the scaling factor.

The base station 105-c and/or the mobile devices 115-c/115-d may compensate for the scaling of the one or more aspects of the flexible bandwidth system, such as transmissions 305-a and/or 305-b, through adjusting a code rate to maintain a data rate affected by the scaling of the one or more aspects of the flexible bandwidth system and/or adjusting a modulation scheme to maintain a data rate affected by the scaling of the one or more aspects of the flexible bandwidth system. Some embodiments may utilize a subframe decoding scheme to at least demodulate or decode a received voice frame to compensate for the scaling of the one or more aspects of the flexible bandwidth system, such as transmissions 305-a and/or 305-b, at the base station 105-c and/or the mobile devices 115-c/115-d.

Transmissions 305-a and/or 305-b between the mobile device 115-c/115-d and the base station 105-c may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may take on numerous different values including, but not limited to, integer values such as 1, 2, 4, etc. N, however, does not have to be an integer.

Some embodiments may utilize additional terminology. A new unit D may be utilized. The unit D is dilated. The unit is unitless and has the value of N. One can talk about time in the flexible system in terms of "dilated time." For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds." Note frequency in Hertz is 1/s.

As discussed above, a flexible waveform may be a waveform that occupies less bandwidth than a normal waveform. Thus, in a flexible bandwidth system, the same number of symbols and bits may be transmitted over a longer duration compared to a normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rate x 1/N), and delay may equal (Normal Delay x N). In general, a flexible systems channel BW=channel BW of normal systems/N. Delay x BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

A flexible waveform is a waveform which occupies less bandwidth than a normal waveform. For example, at the band edge, there may not be enough available spectrum to place a normal waveform. Unlike normal waveforms, there can be partial or complete overlap between normal and flexible waveforms. It is to be noted that the flexible waveform may increase the system capacity. There can be a trade off between extent of overlap and the bandwidth of the flexible waveform. The overlap may create additional interference. Embodiments may be directed at methods, systems, and/or devices and be aimed at reducing the interference.

Figure 4:
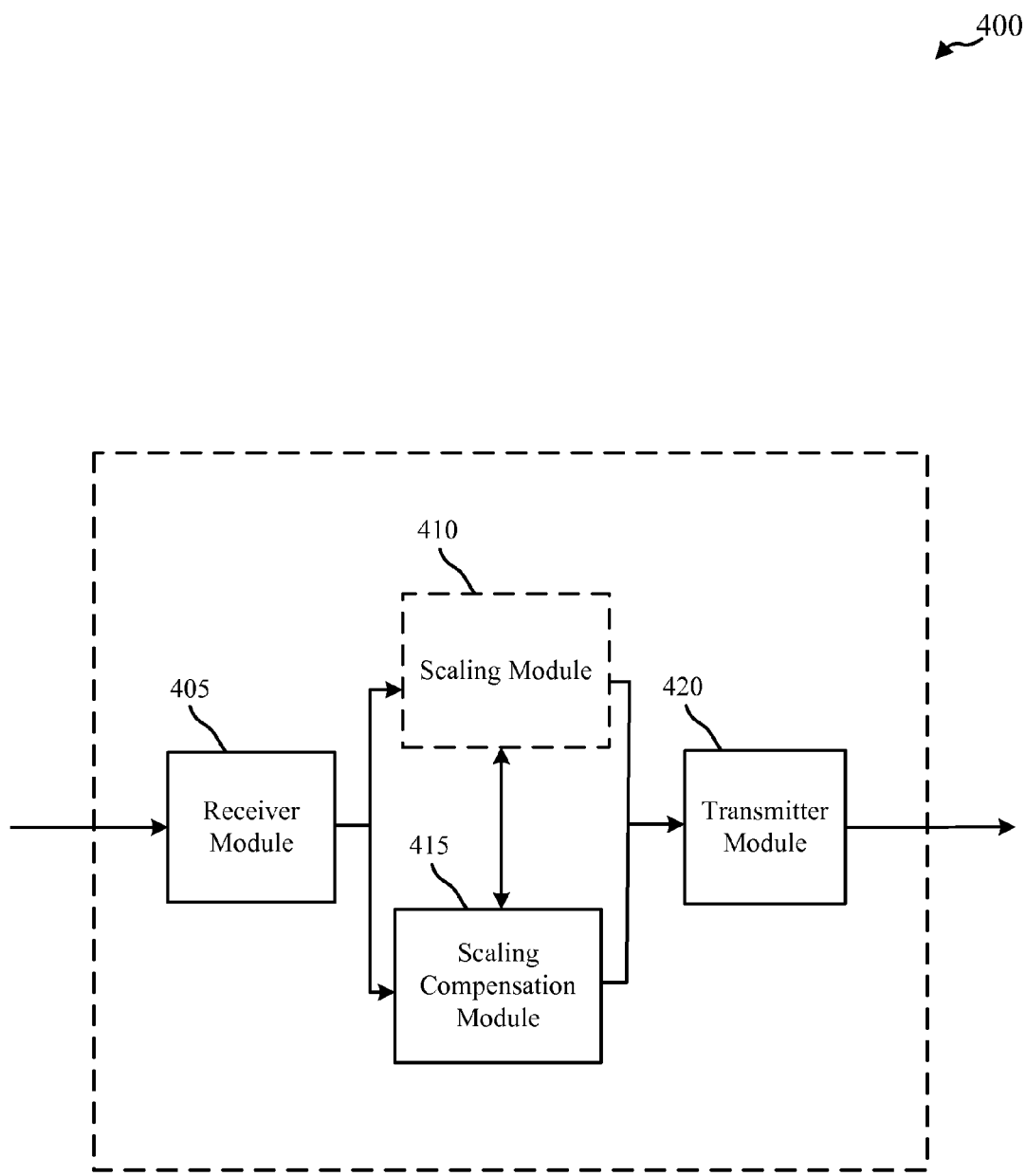
FIG. 4 shows a block diagram of a device configured to provide voice services over a flexible bandwidth system in accordance with various embodiments.

Turning next to FIG. 4, a block diagram illustrates a device 400 for providing a service over a flexible bandwidth system in accordance with various embodiments. The service may include a voice service. The device 400 may be an example of one or more aspects of base stations 105 described with reference to FIG. 1, FIG. 2, FIG. 3, FIG. 12, and/or FIG. 14. The device 400 may be an example of one or more aspects of mobile devices 115 described with reference to FIG. 1, FIG. 2, FIG. 3, FIG. 12, FIG. 13, and/or FIG. 14. The device 400 may also be a processor. The device 400 may include a receiver module 405, a scaling module 410, a scaling compensation module 415, and/or a transmitter module 420. Each of these components may be in communication with each other.

These components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may receive information such as packet, data, and/or signaling information regarding what device 400 has received or transmitted. The received information may be utilized by the coordinating reverse link transmission blanking module 410 for a variety of purposes.

Scaling module 410 may identify one or more scaling factors of the flexible bandwidth system. In some embodiments, one or more aspects of the flexible bandwidth system are scaled based on the scaling factor utilizing the scaling module 410. The scaling of the one or more aspects of the flexible bandwidth system may be compensated for through altering one or more aspects within a code domain utilizing the scaling compensating module 415.

Compensating for the scaling of the one or more aspects of the flexible bandwidth system through altering one or more aspects within the code domain utilizing the scaling compensation module 415 may include a variety of tools and techniques. For example, the compensation may include identifying a spreading factor. The spreading factor may be adjusted utilizing the scaling factor to generate an adjusted spreading factor. In some embodiments, rate tuning matching is applied through at least a puncturing process or a repetition process as part of the spreading factor adjustment process. The transmitter module 420 may increase a transmission power to compensate for at least the adjusted spreading factor or slower power control.

In some embodiments, compensating for the scaling of one or more aspects of the flexible bandwidth utilizing the scaling compensation module 415 includes receiving a voice frame from a MAC layer. One or more slot boundaries may be determined with respect to one or more normal frame boundaries at a PHY layer. The voice frame may be transmitted at one of the one or more slot time boundaries. In some embodiments, transmitting the voice frame at one of the one or more slot time boundaries further includes delaying transmitting the voice frame by a time period; the time period may include an additional slot time boundary.

Compensating for the scaling of the one or more aspects of the flexible bandwidth system through altering one or more aspects within the code domain utilizing the scaling compensation module 415 may include identifying a voice frame. The voice frame may be segmented into multiple sub-blocks as a function of the scaling factor. The multiple sub-blocks may be transmitted simultaneously over multiple channels. The number, or cardinality, of channels may equal the scaling factor. The number, or cardinality, of the multiple channels may exceed the scaling factor.

Compensating for the scaling of the one or more aspects of the flexible bandwidth system through altering one or more aspects within the code domain utilizing the scaling compensation module 415 may include adjusting a code rate to maintain a data rate affected by the scaling of the one or more aspects of the flexible bandwidth system. Compensating for the scaling of the one or more aspects of the flexible bandwidth system through altering one or more aspects within the code domain may include adjusting a modulation scheme to maintain a data rate affected by the scaling of the one or more aspects of the flexible bandwidth system. Some embodiments may utilize a subframe decoding scheme to at least demodulate or decode a received voice frame utilizing the scaling compensation module 415. In some embodiments, scaling compensation module 415 may be configured to compensate for the scaling of a flexible bandwidth system by adjusting the AMR codec rate according to the scaling factor N.

For example, scaling compensation module 415, as discussed above, may be configured to provide solutions for voice service in flexible bandwidth system. Some embodiments provide specific solutions for UMTS flexible bandwidth systems. In some cases, bandwidth may be defined as $$BW_{flex} = \frac{r}{s} BW_{norm},$$

where $BW_{norm}$ is the bandwidth of the system operating in the normal mode, and r and s are positive integers, r≤s Specifically, the following examples may include examples where r=1, which may be the most commonly used configuration. For CDMA and WCDMA system, this may imply that the chip duration in time domain is scaled by a factor of s, and hence, the same scaling for the slot, subframe, and radio frame duration. Here, the corresponds to an example of the scaling factor N discussed above with respect to flexible bandwidth systems. Other embodiments may apply to situations where r≠1.

Due to the scaling in system timing, the current radio configurations with dilated rates may no longer meet some data rates, for example. Moreover, the quality of service may be degraded with dilated rates. To solve this and other problems, some embodiments provide solutions for both the uplink and downlink by maintaining the desired data rate while constraining the introduced latency as small as possible. Some examples provided below focus on UMTS systems; however, the tools and techniques provided may be applicable to other radio access technologies.

Some embodiments may be applicable to adaptive multi-rate (AMR) based voice service in UMTS. AMR audio codec was adopted as the standard speech codec by 3GPP in 1999 and now is widely used in GSM and UMTS. For AMR codec, each voice frame is 20 ms long, and there are a total of 8 types of bit rates ranging from 12.2 kbps to 4.75 kbps. Some embodiments may be configured for voice service using AMR codec with the highest bit rate 12.2 kbps, namely "Conversational/speech/UL:12.2 DL:12.2 kbps/CS RAB+ UL:3.4 DL:3.4 kbps SRBs for DCCH," as defined in 3GPP TS34.108, Section 6.10.2.2. Other embodiments may utilize other bit rates, audio codecs, and/or radio access technologies. Some embodiments may utilize new codecs with different rates and/or different frame sizes; these rates and/or frame sizes may also be flexible rates and/or flexible frame sizes.

In order to maintain the same voice quality in a flexible bandwidth system, it may be desirable to keep the information data rate the same or comparable with that of a normal mode (e.g., 12.2 kbps). That is, one voice frame may still be mapped to a time window (e.g., 20 ms time window) upon transmission, irrespective to the scaling factor N. Some embodiments may change out codecs. Some embodiments may provide different transmission schemes that may achieve such results. For example, some embodiments may adjust spreading factors and/or rate matching tuning Other embodiments may utilize multi-code transmission. These tools and techniques may be utilized separate or in combination with each other. Both transmission schemes may be applied to mobile devices and/or base stations.

Some embodiments adjust one or more spreading factors to compensate for the scaling effects associated with flexible bandwidth systems. For example, compensating for the scaling of the one or more aspects of the flexible bandwidth system through altering one or more aspects within the code domain may include identifying a spreading factor. The spreading factor may be adjusted utilizing the scaling factor to generate an adjusted spreading factor. In some embodiments, rate tuning matching is applied through at least a puncturing process or a repetition process as part of the spreading factor adjustment process. Scaling compensation module 415 of FIG. 4 may be configured to adjust the spreading factors; similarly, scaling compensation module 415-a and/or 415-a of FIG. 12 and FIG. 13, respectively, may adjust spreading factors and/or provide for repetition and/or puncturing. In some embodiments, specific modules such as spreading factor modules 1281/1381, puncturing modules 1282/1382, and/or repetition modules 1283/1383 of FIG. 12 and FIG. 13, respectively, may be utilized to provide specific functions with respect to adjusting spreading factors, utilizing puncturing, and/or utilizing repetition. Some embodiments in particular are applicable to the configurations of the dedicated physical data channel (DPDCH) for both the uplink and downlink with a flexible bandwidth system.

For the normal operating mode (i.e., N=1), $SF_{norm}$ and $C_{norm}$ may represent the spreading factor and the number of channel bits per time window (20 ms in examples provided), respectively. For example, utilizing 3GPP TS34.108, Section 6.10.2.4.1.4, some embodiments have $C_{norm}=1200$ and $SF_{norm,UL}=64$ for uplink and $S_{norm,DL}=128$ for downlink.

For the flexible bandwidth system, when the scaling factor is a multiple of 2 (i.e., $N=2^n$, n=1, 2, . . . ), the spreading factor may be calculated as:

$$SF_{frac} = \frac{SF_{norm}}{N}. \tag{1}$$

For example, the number of channel bits per time window (e.g., 20 ms) can stay unchanged: $C_{frac}=C_{norm}$. When N is not an integer power of 2, the spreading factor may be the following in some cases:

$$SF_{frac} = \frac{SF_{norm}}{2^{floor(log_2 N)}}. \tag{2}$$

In some cases, the spreading factor may be the following:

$$SF_{frac} = \frac{SF_{norm}}{2^{ceil(log_2 N)}}. \tag{3}$$

These adjusted spreading factors may be utilized in conjunction with a suitable number of channel bits per frame achieved by more puncturing or more repetition (compared to the rate matching in normal mode), respectively.

FIG. 5A shows a table 500-a with examples of some possible combinations of the spreading factor and the number of channel bits per time window (e.g., 20 ms) as well as per slot for various values of N. Other combinations may be utilized in some embodiments. In these examples, for uplink, $SF_{UL,DPDCH}$ and $C_{UL,DPDCH}$ denote the spreading factor and the number of channel bits for the physical data channel DPDCH, respectively. For downlink, $SF_{DL,DPCH}$ and $C_{DL,DPCH}$ denote the spreading factor and the number of channel bits for the physical channel DPCH (which is the time multiplex of the DPDCH and DPCCH), respectively, for example.

Some embodiments may provide for channel configurations, such as DPCCH configurations, for flexible bandwidth systems. Scaling compensation module 415 of FIG. 4 may be configured to provide different channel configurations similarly, scaling compensation module 415-a and/or 415-a of FIG. 12 and FIG. 13, respectively, may provide different channel configurations. In some embodiments, specific modules such channel configuration modules 1284/1384 of FIG. 12 and FIG. 13, respectively, may be utilized to provide specific functions with respect to providing different channel configurations. For example for uplink transmission, the numbers of bits in a DPCCH fields using slot format 0 may be shown in table 500-b of FIG. 5B for the scaling factors shown. For the TPC and pilot bits, some embodiments may utilize a simple repetition method by repeating the basic patterns (defined in 3GPP TS25.211, Table 3-5, for example) to yield a total of $(SF_{UL,DPCCH,norm}/SF_{UL,DPCCH,frac})$ copies. For TFCI, the total number of bits per time window (e.g., 20 ms), which may be denoted as $K_{TFCI,20ms}$, are shown in the last column of table 500-*b* of FIG. 5B. In some embodiments, mapping the 32 TFCI encoded bits {$b_0, \ldots, b_{31}$} to the $K_{TFCI,20ms}$ TFCI channel bits {$d_0, \ldots, d_{K_{TFCI,20ms}-1}$} within the 20 ms may be done by $$d_k = b_{k \bmod 32}, k=0, \ldots, K_{TFCI,20ms}-1 \quad (4)$$

For different scaling factors, some embodiments ensure that $K_{TFCI,20ms} > 32$. This may mean that the 32 TFCI encoded bits can be transmitted at least once during the ms duration. For some scaling factors, such as N=4, 8, the number of slots per time window (e.g., 20 ms) may no be longer an integer. This may imply that the time window (e.g., 20 ms window) boundary may fall in the middle of a slot. For such a slot, the number of TFCI bits per slot may be designed such that the TFCI bits from the two consecutive voice frames can be naturally fitted in. For example, when N=8, the number of slots per time window of 20 ms is equal to 3.75, and the number of TFCI bits is equal to 16. For the slot shared by two voice frames, 12 TFCI bits out of the total 16 bits (which may be exactly 75%) may be consumed by the former voice frame and 4 bits by the latter.

In downlink, DPCCH and DPDCH may be time multiplexed as DPCH, and may use the same spreading factor. The number of bits in the downlink DPCCH fields using slot format 8 (which is normally used for voice services) may be shown in FIG. 5C, which includes table 500-*c*, for several example scaling factors. In these examples, the number of TFCI bits is zero. Hence, unlike uplink, no special handling of TFCI may be involved. Similar to uplink, the TPC and pilot bits may be simply obtained by repeating the basic patterns (which may be defined 3GPP TS25.211, Table 12-13) to yield a total of $$(SF_{DL,DPCH,norm}/SF_{DL,DPCH,frac}) \text{ copies.}$$

Some embodiments provide for transmission power adjustment, which may be part of a process to compensate for scaling. Scaling compensation module 415 of FIG. 4 may be configured to provide for transmission power adjustment; similarly, scaling compensation modules 415-*a* and/or 415-*b* of FIG. 12 and FIG. 13, respectively, may adjust transmission power. In some embodiments, specific modules such as transmission power modules 1285/1385 of FIG. 12 and FIG. 13, respectively, may be utilized to provide transmission power adjustments. Generally, reduction in spreading factor may have impacts on the link budget. In order to maintain the same voice service coverage, the mobile device and/or base station may need to increase the transmission power according to the chosen spreading factor and/or rate matching tuning method.

Some embodiments provide for latency management for flexible bandwidth systems. For example, once a first voice frame is available at a MAC, it may be delivered to a PHY. After some PHY layer possible processing, the over-the-air transmission may be allowed to start only at the next radio frame boundary due to the current spec restriction. For a flexible bandwidth system, this may imply that the maximum latency can be as large as one dilated radio frame or, in some embodiments, 10 ms×N, which may be very undesirable when N is large.

Some embodiments address this problem such that the physical layer transmission can be allowed at one or more slot boundaries. For example, compensating for the scaling of one or more aspects of the flexible bandwidth may include receiving a voice frame from a MAC layer. One or more slot boundaries may be determined with respect to one or more normal frame boundaries at a PHY layer. The voice frame may be transmitted at one of the one or more slot time boundaries. In some embodiments, transmitting the voice frame at one of the one or more slot time boundaries further includes delaying transmitting the voice frame by an additional slot time boundary.

Figure 12:
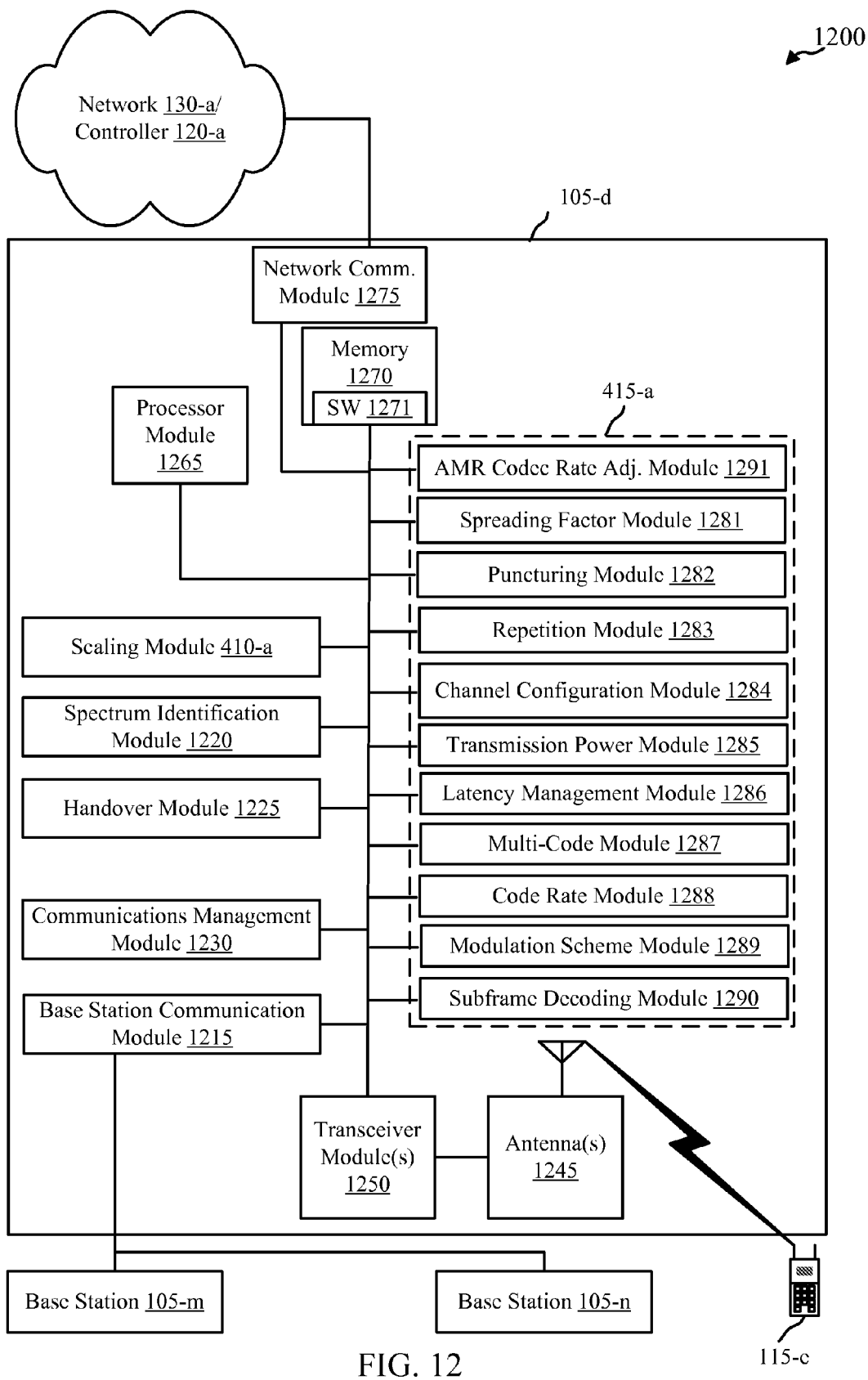
FIG. 12 shows a block diagram of a wireless communications system in accordance with various embodiments.
Figure 13:
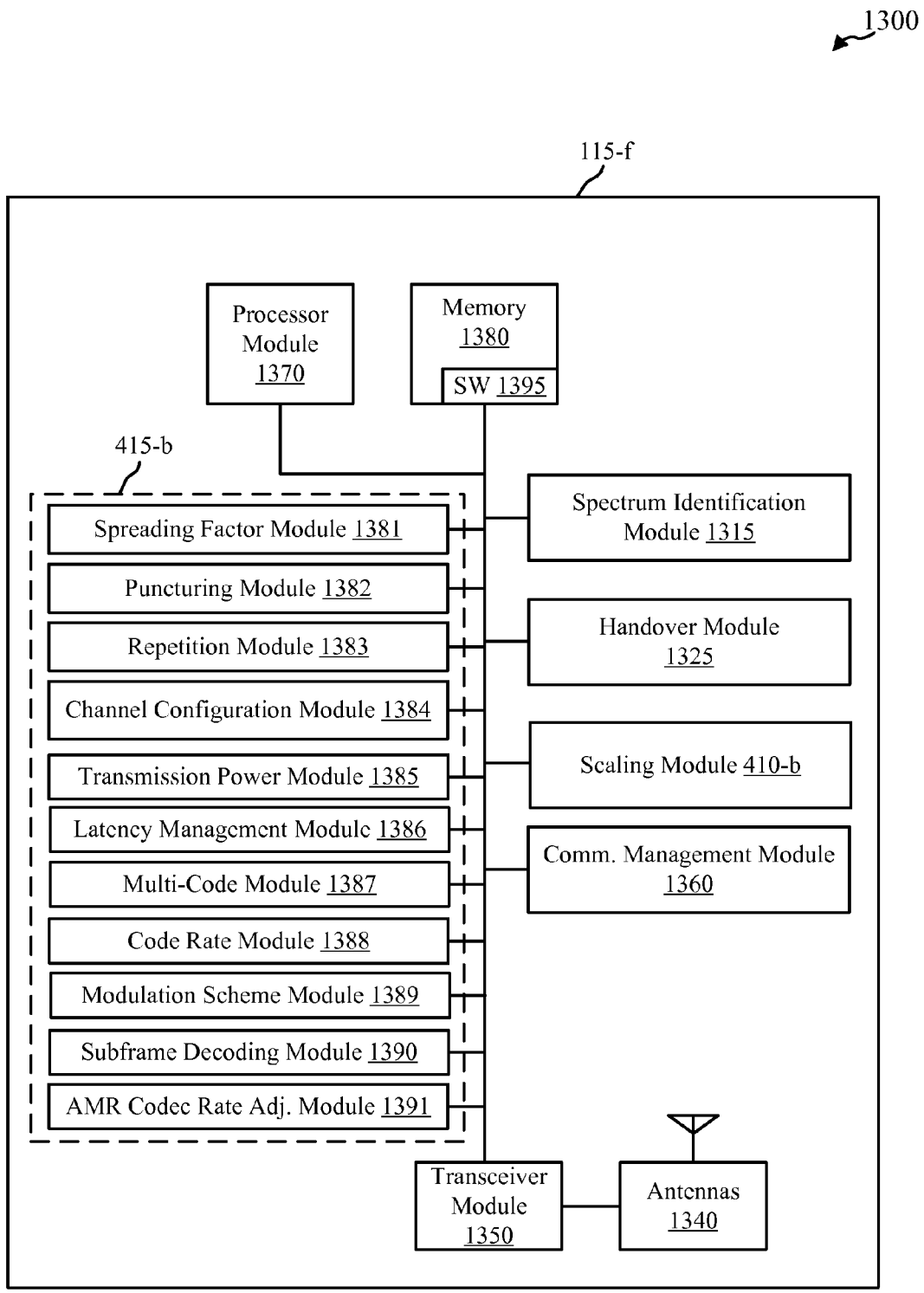
FIG. 13 shows a block diagram of a mobile device in accordance with various embodiments.

Scaling compensation module 415 of FIG. 4 may be configured for latency management in accordance with various embodiments; similarly, scaling compensation modules 415-*a* and/or 415-*a* of FIG. 12 and FIG. 13, respectively, may provide for latency management. In some embodiments, specific modules such as latency management modules 1286/1386 of FIG. 12 and FIG. 13, respectively, may be utilized to provide for latency management.

Some embodiments define the time window (e.g., 20 ms window) as a "sub-TTI" for voice services. The number of time slots contained in a sub-TTI may be calculated. In some embodiments, the number of time slots contained in a sub-TTI that 20 ms may be represented as $$n = \frac{2 \times 15}{N}.$$

Figure 6A:
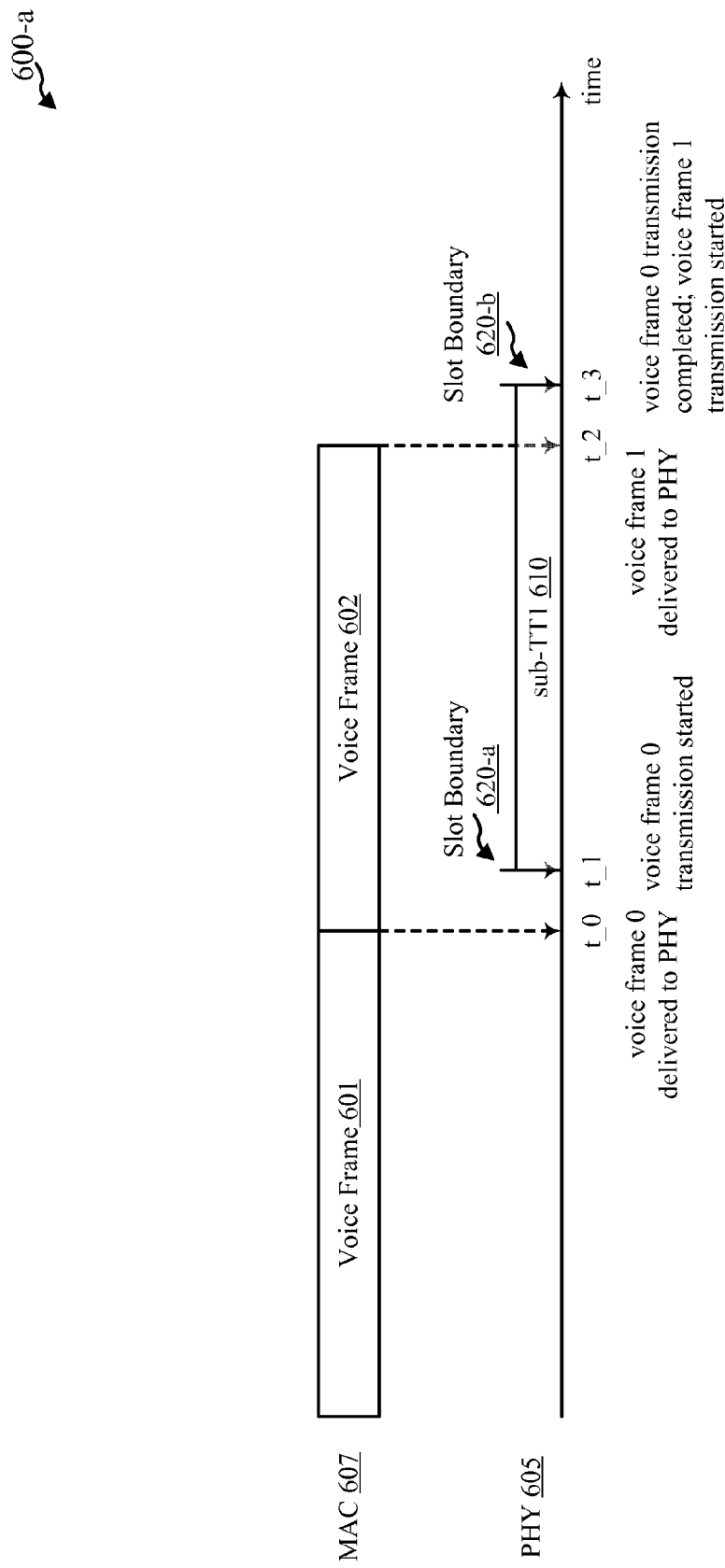
FIGS. 6A and 6B show timing diagrams associated with latency management in accordance with various embodiments.

The timing for the PHY transmission may depend on the value of n. For example, if n is an integer (e.g., N=2, 3, 5, 6), once the voice frame may be delivered to the PHY, the transmission may be started at the next immediate slot boundary. FIG. 6A illustrates one example of a timeline 600-*a* in accordance with various embodiments, where t_0 is the time the voice frame 601 is delivered to the PHY 605 from MAC 607, t_1 is the time when the PHY 605 starts transmission at the next immediate slot boundary 620-*a*, t_2 is the time when voice frame 601 is delivered to the PHY 605, and t_3 is the time the transmission of voice frame 601 is completed and transmission of voice frame 602 is started. Note that the end of sub-TTI 610 may fall exactly on the slot boundary 620-*b* since it may contain an integer number of slots. The maximum delay may be upper bounded by a single slot, or (10 ms×N/15), in some cases.

Figure 6B:
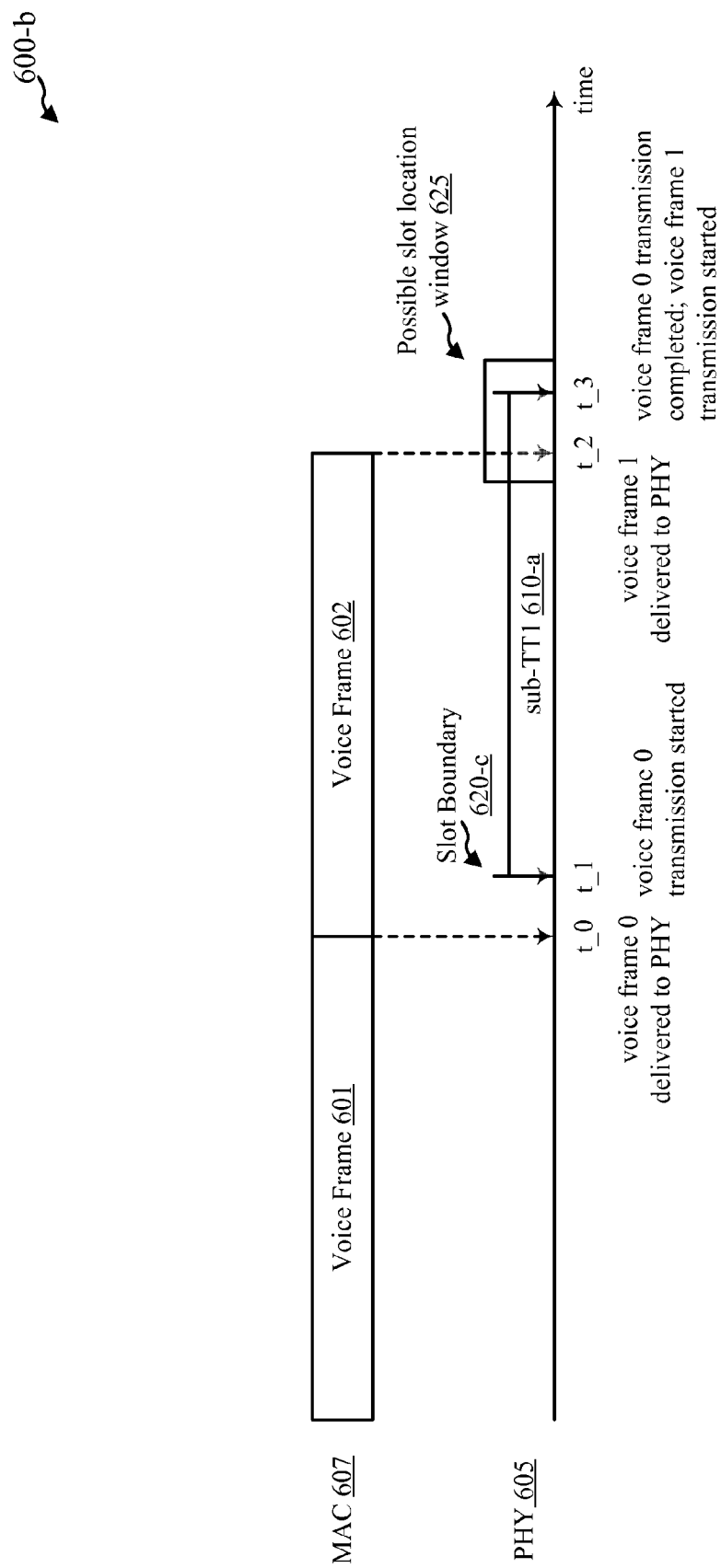

If n is not an integer (e.g., N=4, 8), starting transmission at the next immediate slot boundary may be problematic, since the sub-TTI 610-*a* boundary may fall in the middle of a slot as illustrated in timing diagram 600-*b* of FIG. 6B. The slot location window 625 shows the case in which the time instants t_2 and t_3 both fall in a single slot. For such a case, because the contents to be transmitted during this slot may need to be assembled before the transmission starts, it may be infeasible for the transmission of voice frame 601 to continue right after t_3, and thus, cause an undesired interruption.

Some embodiments may address this issue through delaying the start of transmission by one more slot, i.e., by starting transmission at the second next slot boundary. The maximum delay may be upper bounded by two slots, or, in some embodiments, (2×10 ms×N/15). Timing diagram 600-*b* shows an example of transmission when sub-TTI 610-*a* contains a non-integer number of slots. The start of transmission may be t_1 plus an extra delay of one time slot. FIG. 6C shows a table 600-*c* that provides examples comparing maximum latency with respect to several embodiments that utilize frame boundary approaches compared to slot boundary approaches. Other embodiments may utilize other scaling factors N and may result in different numerical results depending on different factors, such as frame duration.

Some embodiments may utilize multi-code transmission to compensate for scaling effects of flexible bandwidth systems. In some cases, the same spreading factor may not be adjusted. For example, the spreading factor utilized may be as specified in TS34.108 for the normal mode (e.g., SF=64 for uplink and SF=128 for downlink), and in turn, there may be N DPCHs employed.

In some embodiments, scaling compensation module 415 of FIG. 4 is configured to utilize multi-code transmissions to compensate for the scaling of the one or more aspects of the flexible bandwidth system; similarly, scaling compensation modules 415-*a* and/or 415-*b* of FIG. 12 and FIG. 13, respectively, may utilize multi-code transmissions. In some embodiments, specific modules such as multi-code modules 1287/1387 of FIG. 12 and/or FIG. 13 may be utilized to provide specific functions with respect to multi-code transmissions.

Some embodiments transmit voice frames over multiple code channels of the wireless communications system. Such multi-code embodiments may utilize flexible or normal bandwidth systems. Multi-code embodiments include embodiments that utilize an offset between code channels and non-offset embodiments. In some embodiments, the number of code channels used is greater than the scaling factor of the flexible bandwidth code channels. While latency may be increased in some multi-code flexible bandwidth embodiments, other multi-code embodiments for flexible and/or normal bandwidth systems may have the same or even lower latency than a normal bandwidth single code channel system.

The use of multi-code transmissions to compensate for flexible bandwidth scaling may include identifying a voice frame. The voice frame may be segmented into multiple sub-blocks or sub-frames based on the scaling factor. The multiple sub-blocks or sub-frames may be transmitted simultaneously over multiple channels. The number, or cardinality, of channels may equal the scaling factor. In some embodiments, the number, or cardinality, of the multiple channels exceeds the scaling factor.

Figure 7A:
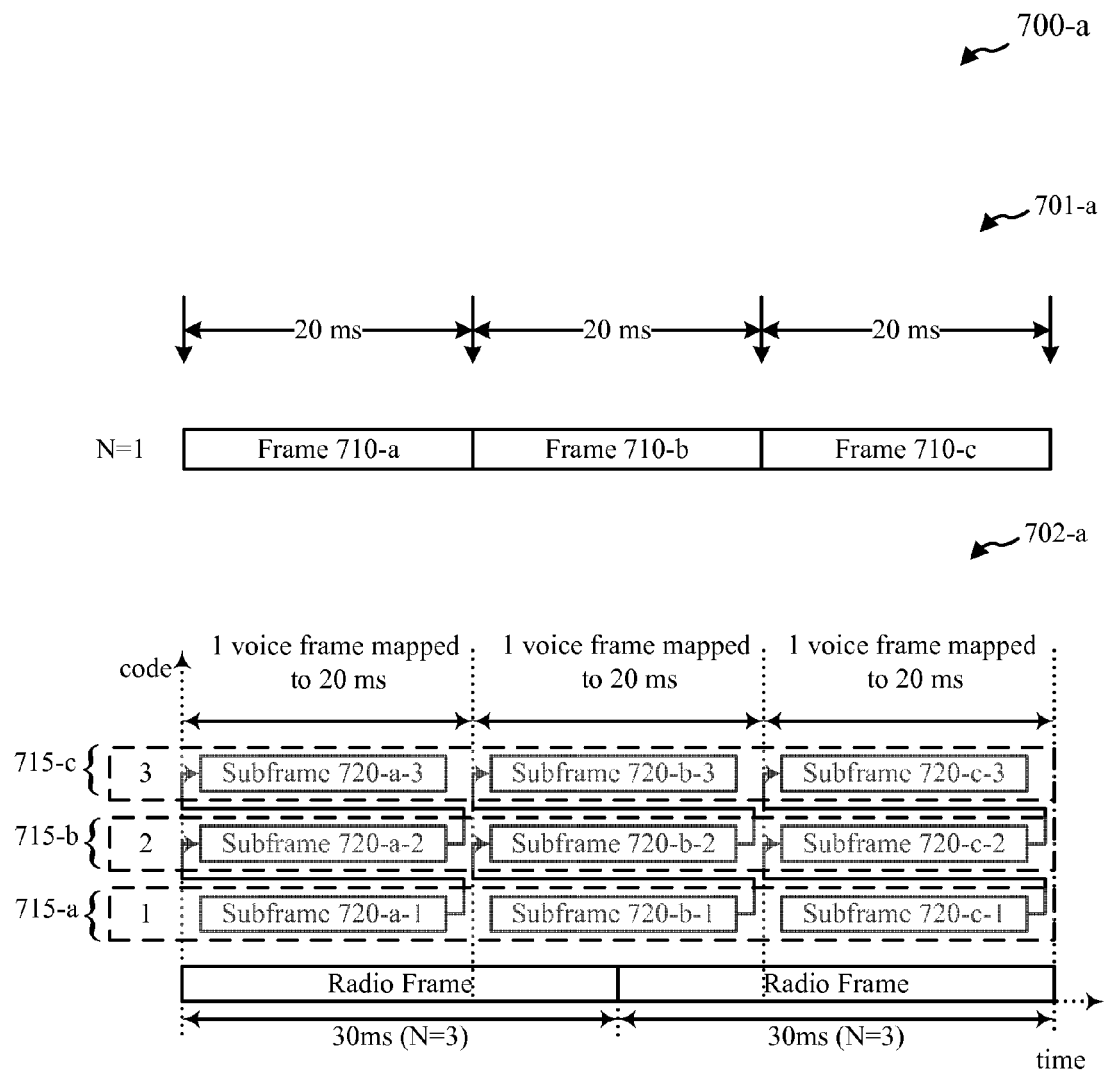
FIG. 7A shows an example of timing diagrams that utilize multi-code transmissions in accordance with various embodiments.

FIG. 7A shows timing diagrams 700-*a* that illustrate an example of a multi-code transmission of voice frames over multiple code channels in accordance with various embodiments. In normal bandwidth system 701-*a* where the bandwidth scaling factor N is equal to 1, each voice frame (e.g., voice frame 710-*a*, 710-*b*, 710-*c*, etc.) may be transmitted during a single frame period of 20 ms, for example. With a multi-code system 702-*a*, each voice frame may be transmitted over multiple code channels using subframes or subblocks in accordance with various embodiments. As illustrated in timing diagrams 700-*a*, multi-code system 702-*a* may split a first voice frame into three sub-frames 720-*a*-1, 720-*a*-2, and 720-*a*-3, and the sub-frames may be transmitted in parallel over a first code channel 715-*a*, second code channel 715-*b*, and the third code channel 715-*c*. Subsequent voice frames may also split into voice subframes (e.g., 720-*b*-1, 720-*b*-2, 720-*b*-3, 720-*c*-1, 720-*c*-2, 720-*c*-3, etc.) and transmitted in parallel over code channels 715-*a*, 715-*b*, and 715-*c*. As illustrated in timing diagrams 700-*a*, a full voice frame may be transmitted during a single frame period using parallel multi-code system 702-*a* with bandwidth scaling factor N equal to 3. As such, this embodiment incurs no increase in frame latency as compared to the normal system 701-*a*

Further, to maintain the same or comparable data rate as the normal mode, one voice frame may still be mapped to a normal time window (e.g., 20 ms time window). The TTI may be tied to multiple radio frames (e.g., two radio frames (20 ms×N)). Thus, within one TTI, there may be N code channels (e.g., N CCTrCHs), one for each voice frame. In some cases, these code channels may be denoted by $CCTrCH_n$, n=1, 2, . . . , N.

Merely by way of example, a mapping from CCTrCHs to physical channels may be described as follows. For each $CCTrCH_n$, it may be segmented into N sub-blocks, namely, $CCTrCH_n^{(i)}$, i=1, 2, . . . , N. Then, for a given index i, the base station may first multiplex the i-th sub-block from each of the N CCTrCHs (i.e., $\{CCTrCH_n^{(i)}, n=1, 2, \ldots, N\}$), and may map the multiplexing result onto DPCH_i. This process may be repeated for each index i=1, 2, . . . , N, and then the N DPCHs may be simultaneously transmitted. For example, FIG. 7A may reflect an example of such mapping process for the scaling factor N=3, where the mapping may be from where each CCTrCH (i.e., subframes 720-*a*-1, 720-*a*-2, 720-*a*-3, 720-*b*-1, 720-*b*-2, 720-*b*-3, 720-*c*-1, 720-*c*-2, 720-*c*-3) to physical channels (i.e., channels 715-*a*, 715-*b*, and 715-*c*, which may be DPCHs).

Figure 7B:
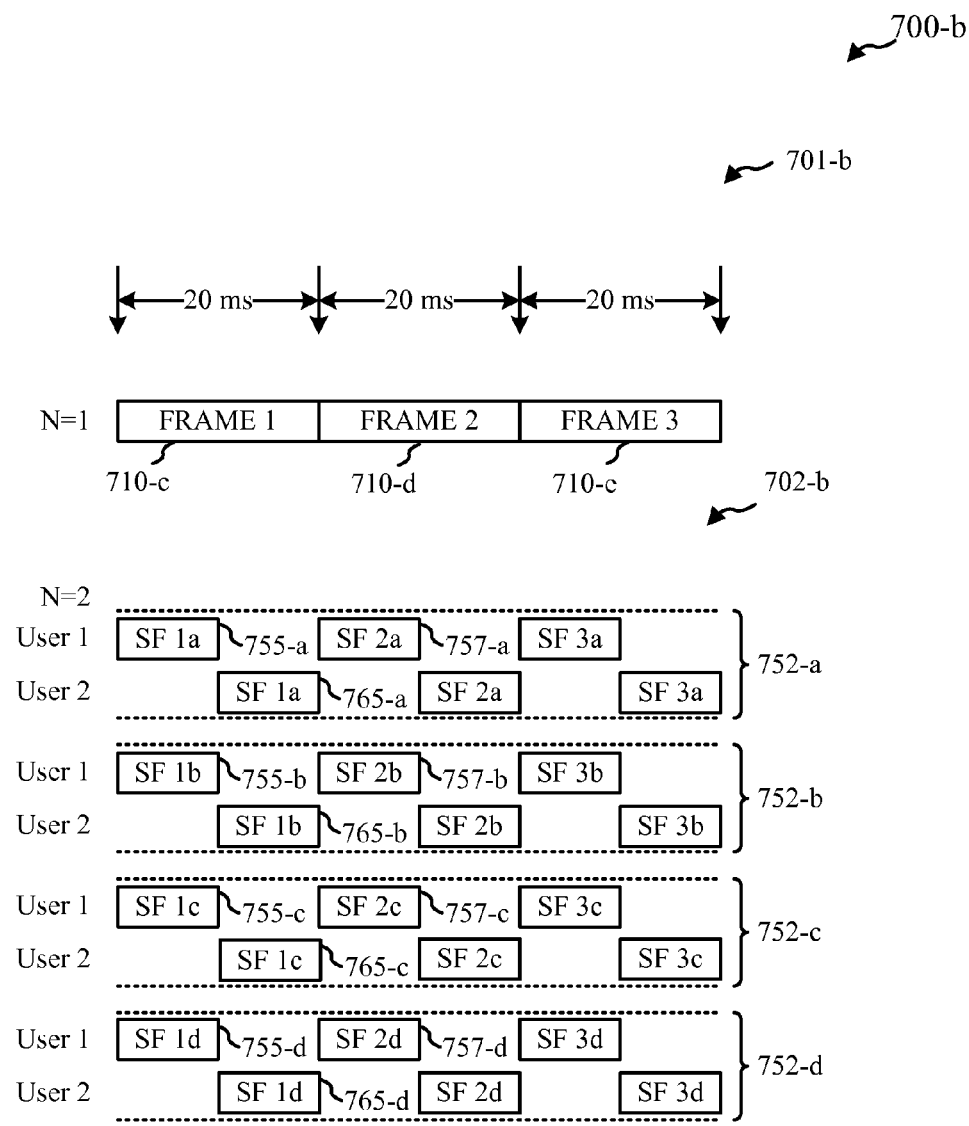
FIG. 7B shows an example of timing diagrams that utilize multi-code transmissions in accordance with various embodiments.

FIG. 7B shows timing diagrams 700-*b* that illustrate a multi-user multi-code system 702-*b* that employs more code channels than may generally be used based on a particular bandwidth scaling factor in accordance with various embodiments. In some cases, this may be also utilized for a single user, rather than for multiple users. FIG. 7B also shows a normal bandwidth system 701-*b* where the bandwidth scaling factor N is equal to 1, each voice frame (e.g., voice frame 710-*c*, 710-*d*, 710-*e*, etc.) may be transmitted during a single frame period of 20 ms, for example. Multi-code multi-user system 702-*b* is illustrated with four code channels and a bandwidth scaling factor N equal to 2. According to multi-user multi-code system 702-*b*, a voice frame may be split into four subframes and transmitted simultaneously during only a portion of a frame period. For example, a voice frame may be split into four subframes 755-*a*, 755-*b*, 755-*c*, and 755-*d*. Each subframe may be transmitted during a first portion of a first frame period on code channels 752-*a*, 752-*b*, 752-*c*, and 752-*d*. As illustrated in timing diagrams 700-*b*, for a flexible bandwidth system with a scaling factor of 2 and using four code channels, each subframe may take half of a frame period for a normal system. Multi-user multi-code system 702-*b* can thus be used to reduce frame latency compared to the normal system 701-*b*. That is, more code channels than generally based on the scaling factor may be used to reduce the transmission delay for encoded voice data. In multi-user multi-code system 702-*b*, for example, a first voice frame may be decoded half of a frame period earlier at the receiver than for a normal system. Each subsequent voice frame (e.g., 757-*a*, 757-*b*, 757-*c*, 757-*d*, etc.) may also take only half of a normal frame period to transmit over the multiple code channels, thereby reducing voice frame latency by one-half of the frame period. In timing diagrams 700-*b*, this may reduces voice frame latency by 10 ms as compared to the normal system 701-*b*, for example.

As illustrated in timing diagrams 700-*b*, multi-user multi-code system 702-*b* may employ time division multiplexing to allow multiple users to share code channels. As illustrated in timing diagrams 700-*b*, a second user may transmit subframes 765-*a*, 765-*b*, 765-*c*, and 765-*d* on code channels 752-*a*, 752-*b*, 752-*c*, and 752-*d* during a second portion of the frame period where the first user is not transmitting. Multi-user multi-code system 702-*b* may also reduce voice frame latency for the second user.

While various flexible bandwidth systems illustrated in FIGS. 7A-7B are described with reference to a bandwidth scaling factor N equal to 2 or 3, these techniques may be used with other bandwidth scaling factors, including a bandwidth scaling factor of 1. For example, multi-code and/or multi-user multi-code systems may be employed with integer scaling factors (e.g., 1, 2, 3, 4, 8, etc.) or non-integer scaling factor. Generally, for non-integer scaling factors (e.g., 0.5, 1.5, 2.5, etc), the system uses a number of code channels given by the next highest integer, next highest integer divisible by 2, or next highest integer that is a power of 2. For example, for a flexible bandwidth scaling factor of 2.2, the system may use 3, 4 or (3 and 4) code channels. For a flexible bandwidth scaling factor of 4.5, the system may use 5, 6, or 8 code channels. Other embodiments may utilize other numbers of code channels. These embodiments may reduce voice frame latency of the voice communications and/or allow time division multiplexing of code channels.

Some embodiments include mapping schemes that may provide advantages to enable the receiving entity to perform subframe decoding of one voice frame at the end of each time window (e.g., 20 ms time window), as opposed to waiting until the end of every two radio frames (which can be intolerably long for a large flexible factor) and decoding all the N voice frames at once. The latency introduced by such transmission scheme may be the initial buffering time of N−1 voice frames, which may be the same as that of a multi-code transmission scheme using spreading factor and rate matching tuning.

In some embodiments, multi-code transmissions may be utilized with some specific physical layer standards (e.g., 3GPP TS25.21). These embodiments may be applicable for UMTS uplink, for example. Multi-code transmission may only be allowed for the spreading factor equal to 4, in some cases, and a maximum number of simultaneous DPDCHs may be 6. Thus, for uplink transmission, the adjusting spreading factor and/or rate matching tuning may provide more flexibility with various scaling factors and hence, may provide a more desired solution to be implemented on the mobile device side. For downlink (e.g., UMTS downlink), since some standards may allow simultaneous multi-code transmission without any restrictions on the spreading factor. As a result, spreading factor adjustment and/or multi-code transmissions schemes may be implemented on the base station side. In some cases, such as with advanced UMTS with flexible bandwidth, the restrictions on the spreading factor and the number of simultaneous channels (e.g., DPDCHs) may be removed for uplink multi-code transmission. Thus, mobile devices may have the freedom to choose either a spreading factor adjustment and/or multi-code transmission. In such case, it could be more desirable to implement the same transmission scheme on both the mobile device and base station sides for a simple unified solution.

Some embodiments may utilize subframe decoding schemes for voice reception. This may help to minimize extra latency introduced by the use of flexible bandwidth. The subframes may include slots or power control groups (PCGs), for example. These decoding schemes may be used in conjunction with either spreading factor adjusting or multi-code transmission schemes, and may be applied to both the mobile device and/or the base station. Scaling compensation module 415 of FIG. 4 may be configured to utilize subframe decoding schemes; similarly, scaling compensation modules 415-a and/or 415-b of FIG. 12 and FIG. 13, respectively, may be configured for subframe decoding schemes. In some embodiments, specific modules such as subframe decoding modules 1290/1390 of FIG. 12 and/or FIG. 13 may be utilized to provide specific functions with respect to subframe decoding schemes.

Figure 8:
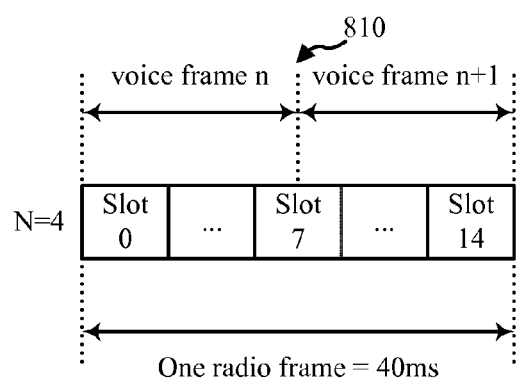
FIG. 8 shows an example of subframe decoding in accordance with various embodiments.

In subframe decoding, the PHY may perform the demodulation and decoding by the end of the time window (e.g., 20 ms time window), and then may deliver the transport channels (corresponding to one voice frame) to the MAC. In some embodiments, subframes may include slots. However, since the window boundary may fall in the middle of a slot, the PHY may need to wait until the end of that slot if its demodulation process may only be triggered at the end of each slot. FIG. 8 shows an example of a subframe decoding timing diagram 800 in accordance with various embodiments. Timing diagram 800 shows window boundary 810 falling in the middle of a slot (Slot 7, in this example). Thus, for this example, the PHY may wait until the end of Slot 7 in some cases. In this example, the scaling factor is N=4, though embodiments may utilize other scaling factors. For the scaling factor N=2, 3, 4, 5, 6, 8 considered in table 500-a of FIG. 5A, the maximum latency introduced may be three quarters of a slot, (i.e., 0.5 ms). Thus, by performing subframe decoding, the TTI on the receiver side may be maintained as one time window (e.g., 20 ms), plus a minor delay due to the wait time for a slot boundary. Note that when multi-code transmission is utilized, the mobile device and/or base station may demodulate and multiplex all the N simultaneously transmitted channels and then proceed to decoding. For example, the base station and/or mobile device may demodulate and multiplex all the N simultaneously transmitted DPCHs, and then proceed to CCTrCH decoding.

Other embodiments may perform subframe decoding of voice frames received over flexible bandwidth code channels utilizing other techniques. Subframes may include slots or power control groups (PCGs). For example, some embodiments may define a termination target that is less than the number of subframes in an encoded voice frame (e.g., full rate voice frame) based on a flexible bandwidth scaling factor of one or more code channels. The transmitter may transmit fewer than all subframes of the voice frame based on the termination target and the receiver may attempt decode of the voice frame based on the received subframes (i.e., attempt decode without receiving all subframes of the voice frame). An outer loop power control set-point may be adjusted to provide a predetermined frame error rate at the termination target.

Some embodiments compensate for the scaling associated with flexible bandwidth systems through other adjustments, such as increasing a code rate and/or using a higher order modulation. For example, these other approaches may be utilized in deriving the uplink and downlink bits for the physical data channel DPDCH, $C_{UL,DPDCH}$ and $C_{DL,DPCH}$ bits sent in 20 ms duration in flexible bandwidth systems. Scaling compensation module 415 of FIG. 4 may be configured to increase code rates and/or use higher modulation orders to compensate for the effects of scaling in flexible bandwidth systems; similarly, scaling compensation modules 415-a and/or 415-b of FIG. 12 and FIG. 13, respectively, may be configured to increase code rates and/or use higher modulation orders. In some embodiments, specific modules such as code rate modules 1288/1388 and/or modulation scheme module 1289/1389 of FIG. 12 and/or FIG. 13, respectively, may be utilized to provide specific functions with respect to increasing code rates and/or utilizing higher order modulation schemes to compensate for scaling within flexible bandwidth systems.

For a flexible bandwidth system, the number of bits after encoding but before rate matching can be reduced so that fewer bits are passed on the rate-matching block. One way to accomplish this may be by increasing the code rate. For example, with the three DCHs carrying AMR speech Classes A, B, and C bit sequences that maybe encoded with a convolutional code with code rates ⅓, ⅓ and ½ respectively, the code rate may be increased for classes A and B bit sequences from ⅓ to ½. For example, the Trch procedure for AMR DL: 12.2 kbps RAB when the convolutional code rate ½ may be used for both Classes A and B bits. In some embodiments, the number of DCH bits before rate matching may be decreased by 212 bits from 772 to 560 bits. In general, if the lengths of the Classes A and B bit sequences (with CRC and tail bits included) are x and y, respectively and these sequences are coded with code rate ½, then the resulting number of bits before rate matching may be x+y less than if code rate ⅓ used in coding both sequences. To decrease the number of bits further, the Class C could be sent uncoded. In that case, if the length of the Class C sequence is z, then x+y+z bits may be sent to the rate matching block.

With further rate matching of the DCH, the uplink and downlink bits for the physical data channel DPDCH, $C_{UL,DPDCH}$ and $C_{DL,DPCH}$ may be obtained. An example illustrating the code rate change application to an N=2 flexible bandwidth system is shown in table 900 of FIG. 9, which shows deriving $C_{UL,DCH}$ and $C_{DL,DPCH}$ bits by changing the code rates.

The first N=2 option shows that an N=2 scaling factor may be supported by changing code rates and puncturing more than it is done in a normal bandwidth system while keeping the spreading factor $SF_{UL,DPDCH}$ and $SF_{DL,DPCH}$ the same. In the second N=2 option, the spreading factor, coder rate and rate matching may be changed to obtain the $C_{UL,DPDCH}$ and $C_{DL,DPCH}$ per 20 ms.

In general, the ability to adjust the code rates adds more flexibility when deriving the physical data channel DPDCH bits. With this flexibility, one may tradeoff the spreading factor, code rate and/or rate-matching to ensure the appropriate number of bits for transmissions and also the acceptance performance. It is worth noting that similar to the degradation that might occur due to more puncturing or lower spreading factor, increasing the code rate may result in coding loss. This loss can be compensated for by increasing the transmit power.

Figure 10:
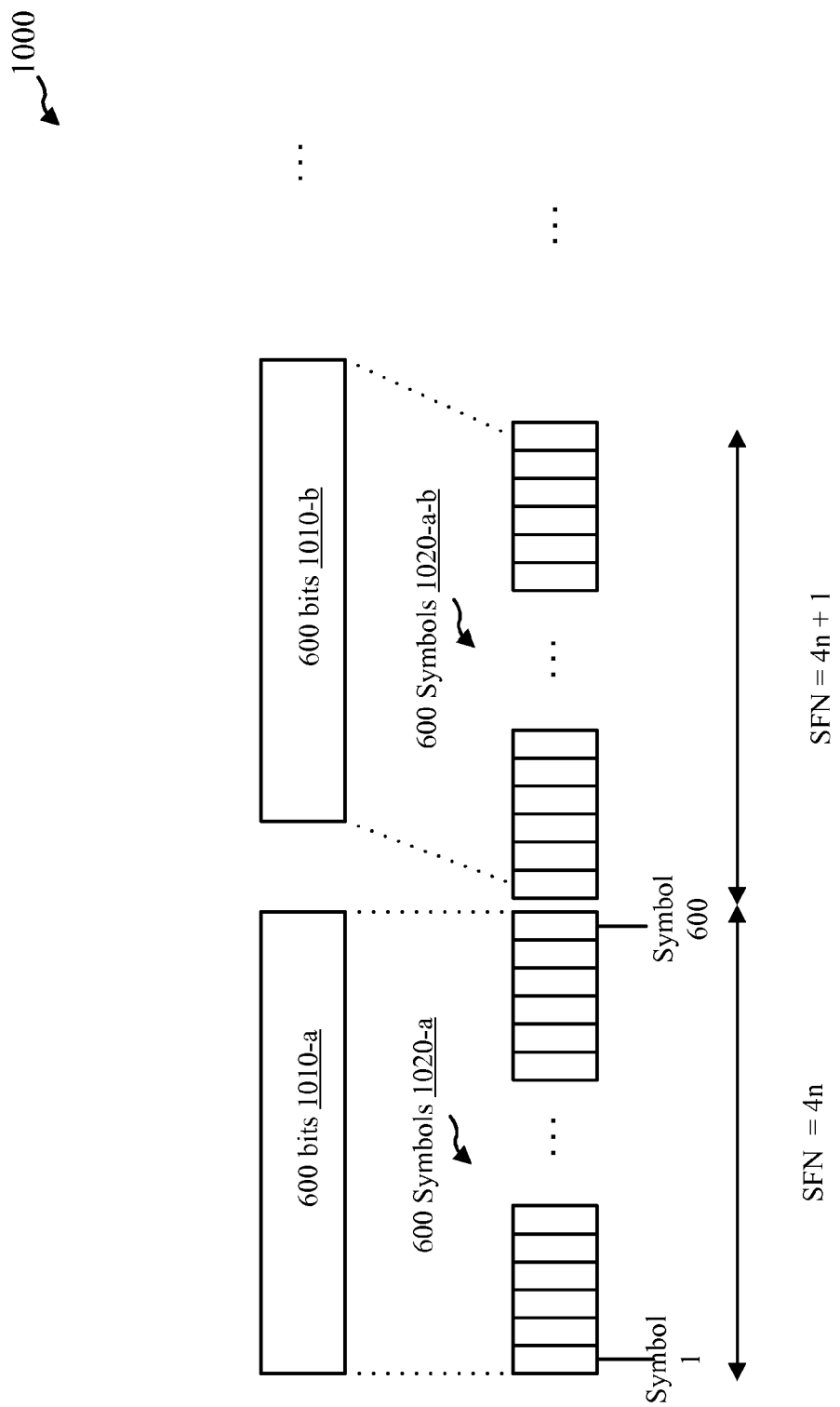
FIG. 10 shows a timing diagram using higher modulation schemes in accordance with various embodiments.

Some embodiments may compensate for the scaling of a flexible bandwidth system by utilizing a higher modulation scheme. For example, by using a higher modulation scheme like 16-QAM and 64-QAM, more bits may be accommodated within a flexible bandwidth system when compared with the QPSK modulation, which is supported in UMTS Release 99. For example, with the QPSK modulation, during the PHCH mapping, the 600 bits per frame (i.e., 1010-*a*, 1010-*b*) shown in timing diagram 1000 of FIG. 10 may be mapped to 600 QPSK symbols (i.e., 1020-*a*, 1020-*b*) since one bit maps to one inphase or quadrature (I/Q) symbol. With 16-QAM modulation (which maps two bits to an I/Q symbol) and for 64-QAM (with three bits mapping to an FQ symbol) twice and thrice more bits may be transmitted in the frame. Other embodiments may utilize different numbers of bits and/or symbols. The impact of the modulation in a flexible bandwidth system may be illustrated with the example in presented in table 1100 of FIG. 11.

Comparing an N=1 system to an N=2 system, if the modulation was not changed, then the number of codes, spreading factor, rate matching and/or code parameters may have to changed to obtain the $C_{UL,DPDCH}$ or $C_{DL,DPCH}$ bits needed to fit in a time window (e.g., 20 ms) duration. With the use of the 16-QAM modulation, 1200 bits may still be accommodated in a 20 ms duration in an N=2 system without changing any of the other parameters. Similarly, an N=3 system may be supported by using 64-QAM. For higher Ns, the modulation adjustment may have to be combined with other parameters like spreading factor, rate-matching, and code rate to obtain the $C_{UL,DPDCH}$ or $C_{DL,DPCH}$ bits per time window duration.

Some embodiments may compensate for the scaling of a flexible bandwidth system by adjusting the AMR codec rate according to the scaling factor N. For example, when N=2, some embodiments may switch from the full rate AMR (12.2 Kbps) to half rate AMR (5.9 Kbps), and may use a configuration such as the following: configuration 1—set the TTI as 40 ms (or in the dilated time domain, 20 Dms); or configuration 2—set the TTI as 20 ms (or in the dilated time domain, 10 Dms); some embodiments may utilize other configurations. For configuration 1, there may be no reduction in redundancy and hence, there may be no change in BLER. Additional latency may be introduced due to buffering (slot level partitioning and/or filling may be utilized to reduce or eliminate the additional latency), i.e., 20 ms on TX and 20 ms on RX side (if no subframe decoding is done). There may be user experience degradation as the voice service operates at half rate with additional latency in some cases. For configuration 2, there may be no SF and/or rate matching adjustment in some cases, and hence, there may be no reduction in redundancy and may be no additional latency in this case. Similarly, when N=4, some embodiments may utilize quarter rate AMR (2.4 Kbps) and may set the TTI as 40 ms (or in the dilated time domain, 10 Dms). The additional latency may be 20 ms on TX and 20 ms on RX side, and two consecutive voice frames may be bundled together in such case. Additional delay may be avoided by setting the TTI as 20 ms (or in the dilated time domain, 5 Dms), i.e., half of the radio frame, which may not be allowed by the current 3GPP specification. Some embodiments may include flexible TTI to match 20 ms absolute time requirement. In some embodiments, to eliminate and/or reduce the additional delay, for example, TTI may be [ceil (20/(N*·67))*·67] Dms or [floor (20/(N*·67))*·67] Dms. In some embodiments, using 2 ms TTI (as in HSPA, for example) may utilize TTI bundling (for values of N<10, for example).

FIG. 12 shows a block diagram of a communications system 1200 that may be configured for utilizing flexible waveforms in accordance with various embodiments. This system 1200 may be an example of aspects of the system 100 depicted in FIG. 1, systems 200 of FIG. 2, system 300 of FIG. 3, and/or system 1400 of FIG. 14. The base station 105-*d* may include antennas 1245, a transceiver module 1250, memory 1270, and a processor module 1265, which each may be in communication, directly or indirectly, with each other (e.g., over one or more buses). The transceiver module 1250 may be configured to communicate bi-directionally, via the antennas 1245, with the mobile device 115-*e*, which may be a multi-mode mobile device. The transceiver module 1250 (and/or other components of the base station 105-*d*) may also be configured to communicate bi-directionally with one or more networks. In some cases, the base station 105-*d* may communicate with the network 130-*a* and/or controller 120-*a* through network communications module 1275. Base station 105-*d* may be an example of an eNodeB base station, a Home eNodeB base station, a NodeB base station, and/or a Home NodeB base station. Controller 120-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with mobile device 115-*e* using different wireless communications technologies, such as different Radio Access Technologies. In some cases, base station 105-*d* may communicate with other base stations such as 105-*m* and/or 105-*n* utilizing base station communication module 1215. In some embodiments, base station communication module 1215 may provide an X2 interface within an LTE wireless communication technology to provide communication between some of the base stations 105. In some embodiments, base station 105-*d* may communicate with other base stations through controller 120-*a* and/or network 130-*a*.

The memory 1270 may include random access memory (RAM) and read-only memory (ROM). The memory 1270 may also store computer-readable, computer-executable software code 1271 containing instructions that are configured to, when executed, cause the processor module 1265 to perform various functions described herein (e.g., call processing, database management, message routing, etc.). Alternatively, the software code 1271 may not be directly executable by the processor module 1265 but be configured to cause the computer, e.g., when compiled and executed, to perform functions described herein.

The processor module 1265 may include an intelligent hardware device, e.g., a central processing unit (CPU) such as those made by Intel® Corporation or AMD®, a microcontroller, an application-specific integrated circuit (ASIC), etc. The processor module 1265 may include a speech encoder (not shown) configured to receive audio via a microphone, convert the audio into packets (e.g., 30 ms in length) representative of the received audio, provide the audio packets to the transceiver module 1250, and provide indications of whether a user is speaking. Alternatively, an encoder may only provide packets to the transceiver module 1250, with the provision or withholding/suppression of the packet itself providing the indication of whether a user is speaking.

The transceiver module 1250 may include a modem configured to modulate the packets and provide the modulated packets to the antennas 1245 for transmission, and to demodulate packets received from the antennas 1245. While some examples of the base station 105-*d* may include a single antenna 1245, the base station 105-*d* preferably includes multiple antennas 1245 for multiple links which may support carrier aggregation. For example, one or more links may be used to support macro communications with mobile device 115-*e*.

According to the architecture of FIG. 12, the base station 105-*d* may further include a communications management module 1230. The communications management module 1230 may manage communications with other base stations 105. By way of example, the communications management module 1230 may be a component of the base station 105-*d* in communication with some or all of the other components of the base station 105-*d* via a bus. Alternatively, functionality of the communications management module 1230 may be implemented as a component of the transceiver module 1250, as a computer program product, and/or as one or more controller elements of the processor module 1265.

The components for base station 105-*d* may be configured to implement aspects discussed above with respect to device 400 in FIG. 4 and may not be repeated here for the sake of brevity. For example, the scaling compensation module 415-*a* may be the scaling compensation module 415 of FIG. 4. The scaling compensation module 415-*a* may include one or more modules or sub-modules to implement scaling compensation as discussed above. For example, the scaling compensation module 415-*a* may include a spreading factor module 1281, a puncturing module 1282, a repetition module 1283, a channel configuration module 1284, a transmission power module 1285, a latency management module 1286, a multi-code module 1287, a code rate module 1288, a modulation scheme module 1289, and/or a subframe decode module 1290. In some embodiments, the scaling compensation module 415-*a* may include an AMR codec rate adjustment module 1291 configured to adjust an AMR codec rate based on a flexible bandwidth scaling factor.

The base station 105-*d* may also include a spectrum identification module 1220. The spectrum identification module 1220 may be utilized to identify spectrum available for flexible waveforms. In some embodiments, a handover module 1225 may be utilized to perform handover procedures of the mobile device 115-*e* from one base station 105 to another. For example, the handover module 1225 may perform a handover procedure of the mobile device 115-*e* from base station 105-*d* to another where normal waveforms are utilized between the mobile device 115-*e* and one of the base stations and flexible waveforms are utilized between the mobile device and another base station. A scaling module 410-*a* may be utilized to scale and/or alter chip rates to generate flexible waveforms; this may be example of the scaling module 410 of FIG. 4.

In some embodiments, the transceiver module 1250 in conjunction with antennas 1245, along with other possible components of base station 105-*d*, may transmit information regarding flexible waveforms and/or scaling factors from the base station 105-*d* to the mobile device 115-*e*, to other base stations 105-*m*/105-*n*, or core network 130-*a*. In some embodiments, the transceiver module 1250 in conjunction with antennas 1245, along with other possible components of base station 105-*d*, may transmit information to the mobile device 115-*e*, to other base stations 105-*m*/105-*n*, or core network 130-*a*, such as flexible waveforms and/or scaling factors, such that these devices or systems may utilize flexible waveforms.

FIG. 13 is a block diagram 1300 of a mobile device 115-*f* configured to facilitate the use of flexible bandwidth in accordance with various embodiments. The mobile device 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*f* may have an internal power supply (not shown), such as a small battery, to facilitate mobile operation. In some embodiments, the mobile device 115-*f* may be the mobile device 115 of FIG. 1, FIG. 2, FIG. 3, FIG. 12, and/or FIG. 14, and/or the device 400 of FIG. 4. The mobile device 115-*f* may be a multi-mode mobile device. The mobile device 115-*f* may be referred to as a wireless communications device in some cases.

The mobile device 115-*f* may include antennas 1340, a transceiver module 1350, memory 1380, and a processor module 1370, which each may be in communication, directly or indirectly, with each other (e.g., via one or more buses). The transceiver module 1350 is configured to communicate bi-directionally, via the antennas 1340 and/or one or more wired or wireless links, with one or more networks, as described above. For example, the transceiver module 1350 may be configured to communicate bi-directionally with base stations 105 of FIG. 1, FIG. 2, FIG. 3, FIG. 12, and/or FIG. 14. The transceiver module 1350 may include a modem configured to modulate the packets and provide the modulated packets to the antennas 1340 for transmission, and to demodulate packets received from the antennas 1340. While the mobile device 115-$f$ may include a single antenna, the mobile device 115-$f$ will typically include multiple antennas 1340 for multiple links.

The memory 1380 may include random access memory (RAM) and read-only memory (ROM). The memory 1380 may store computer-readable, computer-executable software code 1395 containing instructions that are configured to, when executed, cause the processor module 1370 to perform various functions described herein (e.g., call processing, database management, message routing, etc.). Alternatively, the software 1395 may not be directly executable by the processor module 1370 but be configured to cause the computer (e.g., when compiled and executed) to perform functions described herein.

The processor module 1370 may include an intelligent hardware device, e.g., a central processing unit (CPU) such as those made by Intel® Corporation or AMD®, a microcontroller, an application-specific integrated circuit (ASIC), etc. The processor module 1370 may include a speech encoder (not shown) configured to receive audio via a microphone, convert the audio into packets (e.g., 30 ms in length) representative of the received audio, provide the audio packets to the transceiver module 1350, and provide indications of whether a user is speaking. Alternatively, an encoder may only provide packets to the transceiver module 1350, with the provision or withholding/suppression of the packet itself providing the indication of whether a user is speaking.

According to the architecture of FIG. 13, the mobile device 115-$f$ may further include a communications management module 1360. The communications management module 1360 may manage communications with other mobile devices 115. By way of example, the communications management module 1360 may be a component of the mobile device 115-$f$ in communication with some or all of the other components of the mobile device 115-$f$ via a bus. Alternatively, functionality of the communications management module 1360 may be implemented as a component of the transceiver module 1350, as a computer program product, and/or as one or more controller elements of the processor module 1370.

The components for mobile device 115-$f$ may be configured to implement aspects discussed above with respect to device 400 of FIG. 4. and may not be repeated here for the sake of brevity. For example, the scaling compensation module 415-$b$ may be the scaling compensation module 415 of FIG. 4. The scaling compensation module 415-$b$ may include one or more modules or sub-modules to implement scaling compensation as discussed above. For example, the scaling compensation module 415-$b$ may include a spreading factor module 1381, a puncturing module 1382, a repetition module 1383, a channel configuration module 1384, a transmission power module 1385, a latency management module 1386, a multi-code module 1387, a code rate module 1388, a modulation scheme module 1389, and/or an subframe decode module 1390. In some embodiments, the scaling compensation module 415-$b$ may include an AMR codec rate adjustment module 1391 configured to adjust an AMR codec rate based on a flexible bandwidth scaling factor.

The mobile device 115-$f$ may also include a spectrum identification module 1315. The spectrum identification module 1315 may be utilized to identify spectrum available for flexible waveforms. In some embodiments, a handover module 1325 may be utilized to perform handover procedures of the mobile device 115-$f$ from one base station to another. For example, the handover module 1325 may perform a handover procedure of the mobile device 115-$f$ from one base station to another where normal waveforms are utilized between the mobile device 115-$f$ and one of the base stations and flexible waveforms are utilized between the mobile device and another base station. A scaling module 410-$b$ may be utilized to scale and/or alter chip rates to generate flexible waveforms; scaling module 410-$b$ may be an example of scaling module 410 of FIG. 5

In some embodiments, the transceiver module 1350 in conjunction with antennas 1340, along with other possible components of mobile device 115-$f$, may transmit information regarding flexible waveforms and/or scaling factors from the mobile device 115-$f$ to base stations or a core network. In some embodiments, the transceiver module 1350, in conjunction with antennas 1340 along with other possible components of mobile device 115-$f$, may transmit information, such as flexible waveforms and/or scaling factors, to base stations or a core network such that these devices or systems may utilize flexible waveforms.

Figure 14:
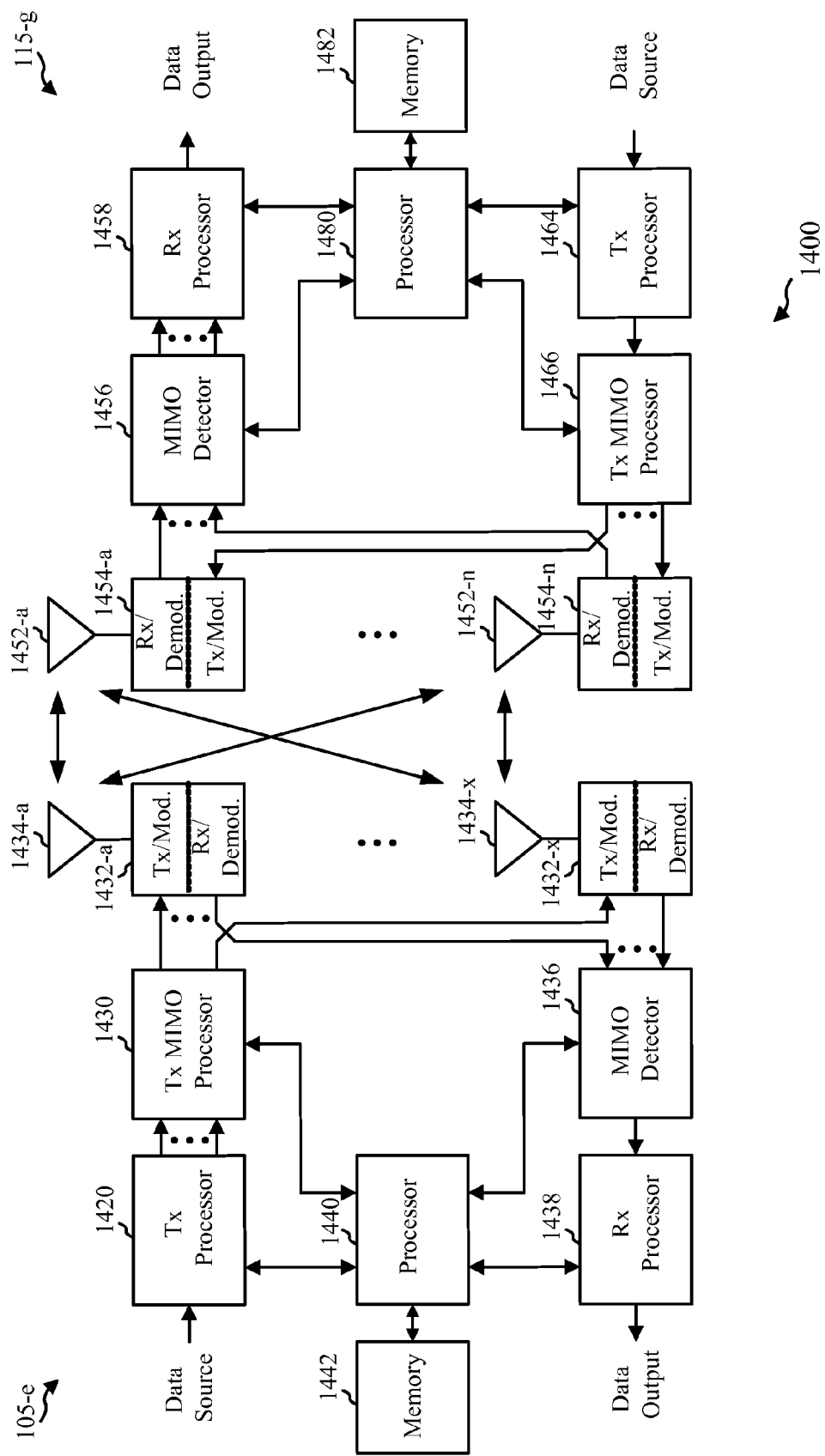
FIG. 14 shows a block diagram of a wireless communications system that includes a base station and a mobile device in accordance with various embodiments.

FIG. 14 is a block diagram of a system 1400 including a base station 105-$e$ and a mobile device 115-$g$ in accordance with various embodiments. This system 1400 may be an example of the system 100 of FIG. 1, systems 200 of FIG. 2, system 300 of FIG. 3, and/or system 1200 of FIG. 12. The base station 105-$e$ may be equipped with antennas 1434-$a$ through 1434-$x$, and the mobile device 115-$g$ may be equipped with antennas 1452-$a$ through 1452-$n$. At the base station 105-$e$, a transmitter processor 1420 may receive data from a data source.

The transmitter processor 1420 may process the data. The transmitter processor 1420 may also generate reference symbols, and a cell-specific reference signal. A transmit (TX) MIMO processor 1430 may perform spatial processing (e.g., precoding) on data symbols, control symbols, and/or reference symbols, if applicable, and may provide output symbol streams to the transmit modulators 1432-$a$ through 1432-$x$. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink (DL) signal. In one example, DL signals from modulators 1432-$a$ through 1432-$x$ may be transmitted via the antennas 1434-$a$ through 1434-$x$, respectively. The transmitter processor 1420 may receive information from a processor 1440. The processor 1440 may be configured to generate flexible waveforms through altering a chip rate and/or utilizing a scaling factor; this may be done dynamically in some cases. The processor 1440 may also provide for different alignment and/or offsetting procedures. The processor 1440 may also utilize scaling and/or chip rate information to perform measurements on the other subsystems, perform handoffs to the other subsystems, perform reselection, etc. The processor 1440 may invert the effects of time stretching associated with the use of flexible bandwidth through parameter scaling. In some embodiments, the processor 1440 may be implemented as part of a general processor, the transmitter processor 1420, and/or the receiver processor 1438. The processor 1440 may be coupled with a memory 1442.

In some embodiments, the processor 1440 is configured for providing voice service over a flexible bandwidth system. In providing voice services over the flexible bandwidth system, the processor 1440 may compensate for the scaling of one or more aspects of the flexible bandwidth system.

This may be achieved through altering one or more aspects with a code domain. For example, the processor may identify and/or adjust a spreading factor utilizing the scaling factor to generate an adjusted spreading factor to compensate for the scaling. The processor 1440 may compensate for flexible bandwidth scaling utilizing other techniques including the use of multi-code transmissions, latency management, subframe decoding, adjusted code rates, adjusted AMR codec rates, and/or adjusted modulations schemes.

At the mobile device 115-*g*, the mobile device antennas 1452-*a* through 1452-*n* may receive the DL signals from the base station 105-*e* and may provide the received signals to the demodulators 1454-*a* through 1454-*n*, respectively. Each demodulator 1454 may condition (e.g., filter, amplify, downconvert, and digitize) a respective received signal to obtain input samples. Each demodulator 1454 may further process the input samples (e.g., for OFDM, etc.) to obtain received symbols. A MIMO detector 1456 may obtain received symbols from all the demodulators 1454-*a* through 1454-*n*, perform MIMO detection on the received symbols if applicable, and provide detected symbols. A receive processor 1458 may process (e.g., demodulate, deinterleave, and decode) the detected symbols, providing decoded data for the mobile device 115-*g* to a data output, and provide decoded control information to a processor 1480, or memory 1482.

On the uplink (UL), at the mobile device 115-*g*, a transmitter processor 1464 may receive and process data from a data source. The transmitter processor 1464 may also generate reference symbols for a reference signal. The symbols from the transmitter processor 1464 may be precoded by a transmit MIMO processor 1466 if applicable, further processed by the demodulators 1454-*a* through 1454-*n* (e.g., for SC-FDMA, etc.), and be transmitted to the base station 105-*e* in accordance with the transmission parameters received from the base station 105-*e*. The transmitter processor 1464 may also be configured to generate flexible waveforms through altering a chip rate and/or utilizing a scaling factor; this may be done dynamically in some cases. The transmitter processor 1464 may receive information from processor 1480. The processor 1480 may provide for different alignment and/or offsetting procedures. The processor 1480 may also utilize scaling and/or chip rate information to perform measurements on the other subsystems, perform handoffs to the other subsystems, perform reselection, etc. The processor 1480 may invert the effects of time stretching associated with the use of flexible bandwidth through parameter scaling. At the base station 105-*e*, the UL signals from the mobile device 115-*g* may be received by the antennas 1434, processed by the demodulators 1432, detected by a MIMO detector 1436 if applicable, and further processed by a receive processor. The receive processor 1438 may provide decoded data to a data output and to the processor 1480. In some embodiments, the processor 1480 may be implemented as part of a general processor, the transmitter processor 1464, and/or the receiver processor 1458.

In some embodiments, the processor 1480 is configured for providing voice service over a flexible bandwidth system. In providing voice services over the flexible bandwidth system, the processor 1480 may compensate for the scaling of one or more aspects of the flexible bandwidth system. This may be achieved through altering one or more aspects with a code domain. For example, the processor may identify and/or adjust a spreading factor utilizing the scaling factor to generate an adjusted spreading factor to compensate for the scaling. The processor 1480 may compensate for flexible bandwidth scaling utilizing other techniques including the use of multi-code transmissions, latency management, subframe decoding, adjusted code rates, adjusted AMR codec rates, and/or adjusted modulations schemes.

Figure 15A:
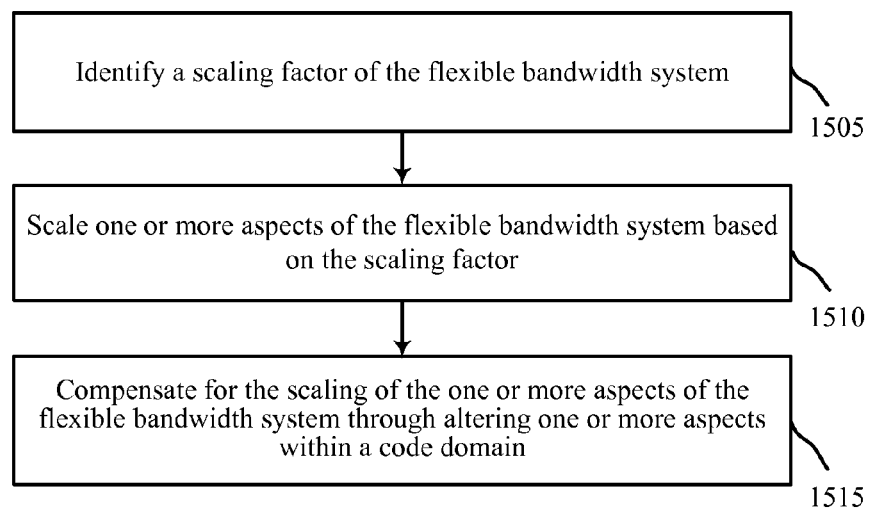
FIG. 15A shows a flow diagram of a method for providing voices services over a flexible bandwidth system in accordance with various embodiments.

Turning to FIG. 15A, a flow diagram of a method 1500-*a* for providing a service, such as a voice service, over a flexible bandwidth system in accordance with various embodiments. Method 1500-*a* may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-*a* may be implemented utilizing various wireless communications devices including, but not limited to: a mobile device 115 as seen in FIG. 1, FIG. 2, FIG. 3, FIG. 12, FIG. 13, and/or FIG. 14, and/or a core network 130 and/or controller 120 as seen in FIG. 1 and/or FIG. 12.

At block 1505, a scaling factor of the flexible bandwidth system may be identified. In some embodiments, one or more aspects of the flexible bandwidth system are scaled based on the scaling factor as shown in block 1510. At block 1515, the scaling of the one or more aspects of the flexible bandwidth system may be compensated for through altering one or more aspects within a code domain.

Compensating for the scaling of the one or more aspects of the flexible bandwidth system through altering one or more aspects within the code domain may utilize a variety of tools and techniques. For example, the compensation may include identifying a spreading factor. The spreading factor may be adjusted utilizing the scaling factor to generate an adjusted spreading factor. In some embodiments, rate tuning matching is applied through at least a puncturing process or a repetition process as part of the spreading factor adjustment process. Some embodiments include increasing a transmission power to compensate for at least the adjusted spreading factor or a slower power control. Some embodiments may include increasing a power control rate and/or changing a power control step.

In some embodiments, compensating for the scaling of one or more aspects of the flexible bandwidth includes receiving a voice frame from a MAC layer. One or more slot boundaries may be determined with respect to one or more normal frame boundaries at a PHY layer. The voice frame may be transmitted at one of the one or more slot time boundaries. In some embodiments, transmitting the voice frame at one of the one or more slot time boundaries further includes delaying transmitting the voice frame by a time period; the time period may include an additional slot time boundary.

Compensating for the scaling of the one or more aspects of the flexible bandwidth system through altering one or more aspects within the code domain may include identifying a voice frame. The voice frame may be segmented into multiple sub-blocks based on the scaling factor. The multiple sub-blocks may be transmitted simultaneously over multiple channels. The number, or cardinality, of channels may equal the scaling factor. The number, or cardinality, of the multiple channels may exceed the scaling factor.

Compensating for the scaling of the one or more aspects of the flexible bandwidth system through altering one or more aspects within the code domain may include adjusting a code rate to maintain a data rate affected by the scaling of the one or more aspects of the flexible bandwidth system. Compensating for the scaling of the one or more aspects of the flexible bandwidth system through altering one or more aspects within the code domain may include adjusting a modulation scheme to maintain a data rate affected by the scaling of the one or more aspects of the flexible bandwidth system. Some embodiments may utilize an subframe decoding scheme to at least demodulate or decode a received voice frame. Compensating for the scaling of the one or more aspects of the flexible bandwidth system through altering one or more aspects within the code domain may include adjusting an AMR codec rate according to the scaling factor.

Figure 15B:
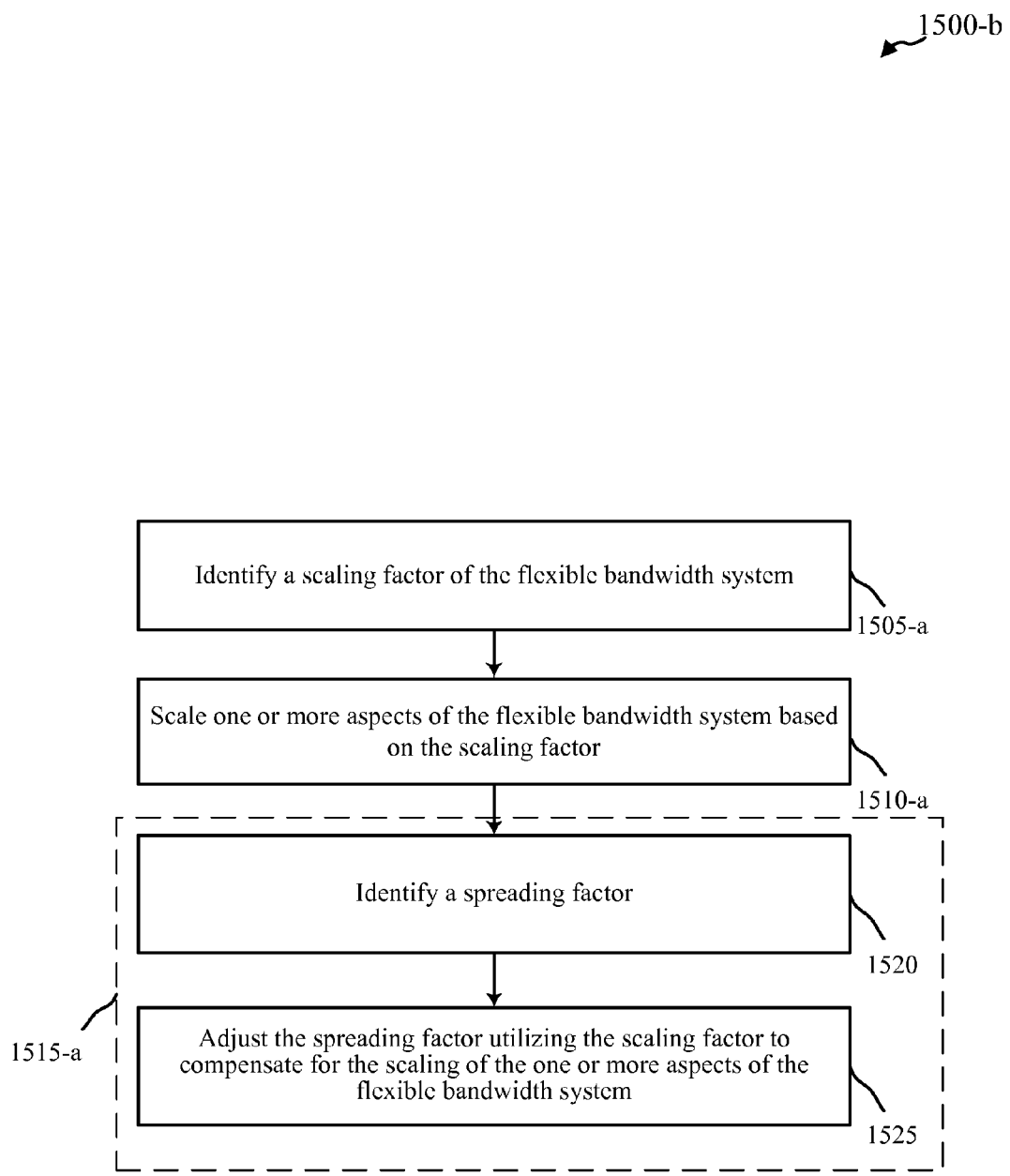
FIG. 15B shows a flow diagram of a method for providing voices services over a flexible bandwidth system in accordance with various embodiments.

Turning to FIG. 15B, a flow diagram of a method 1500-b for providing a service, such as a voice service, over a flexible bandwidth system in accordance with various embodiments. Method 1500-b may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-b may be implemented utilizing various wireless communications devices including, but not limited to: a mobile device 115 as seen in FIG. 1, FIG. 2, FIG. 3, FIG. 12, FIG. 13, and/or FIG. 14, and/or a core network 130 and/or controller 120 as seen in FIG. 1 and/or FIG. 12. Method 1500-b may be an example of method 1500-a of FIG. 15A.

At block 1505-a, a scaling factor of the flexible bandwidth system may be identified. In some embodiments, one or more aspects of the flexible bandwidth system are scaled based on the scaling factor as shown in block 1510-a. The scaling of the one or more aspects of the flexible bandwidth system may be compensated for through altering one or more aspects within a code domain utilizing one or more steps as shown in block 1515-a. For example, at block 1520, a spreading factor may be identified. The spreading factor may be adjusted utilizing the scaling factor to generate an adjusted spreading factor to compensate for the scaling of the one or more aspects of the flexible bandwidth system at block 1525. In some embodiments, rate tuning matching is applied through at least a puncturing process or a repetition process as part of the spreading factor adjustment process.

Figure 15C:
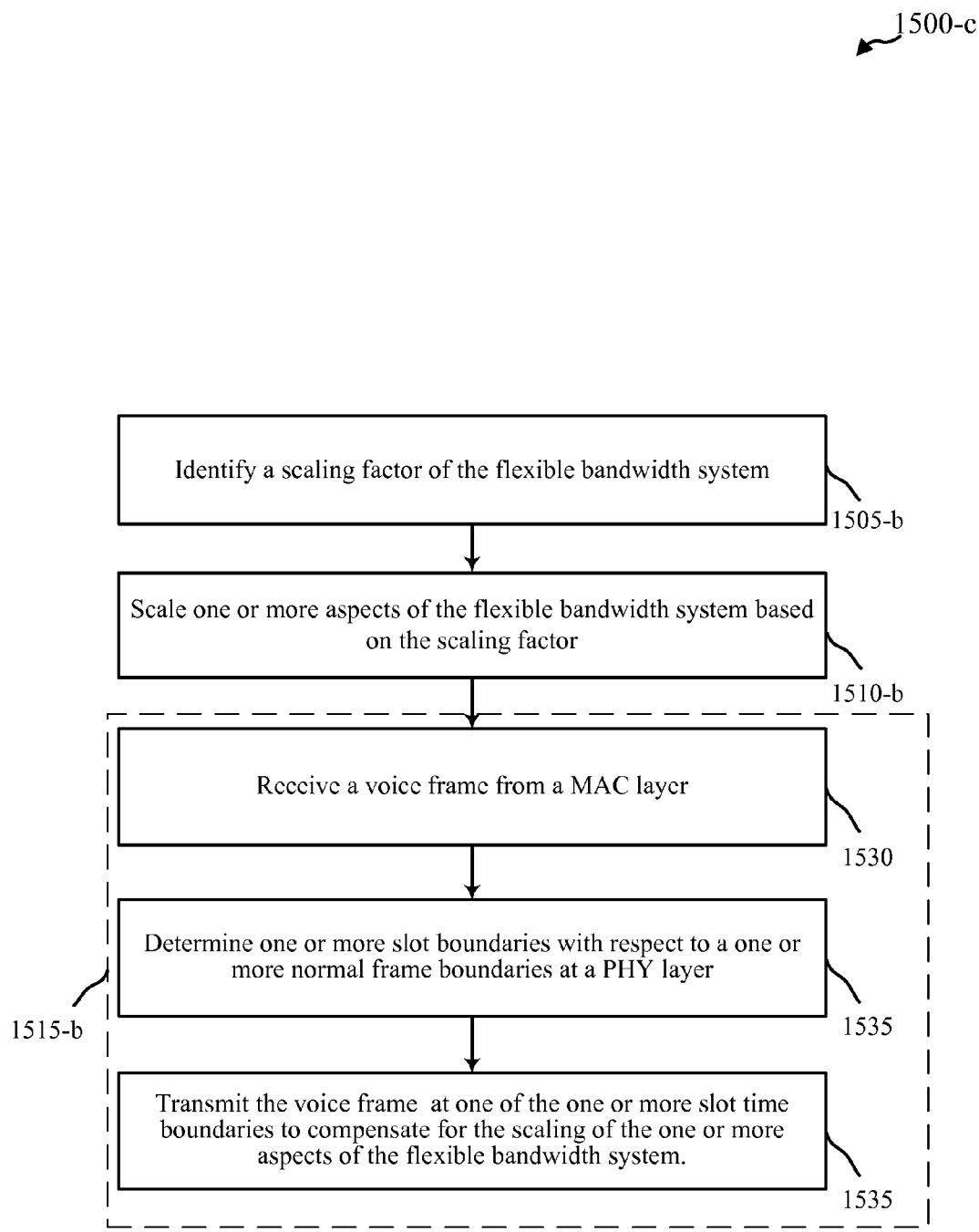
FIG. 15C shows a flow diagram of a method for providing voices services over a flexible bandwidth system in accordance with various embodiments.

Turning to FIG. 15C, a flow diagram of a method 1500-c for providing a service, such as a voice service, over a flexible bandwidth system in accordance with various embodiments. Method 1500-c may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-c may be implemented utilizing various wireless communications devices including, but not limited to: a mobile device 115 as seen in FIG. 1, FIG. 2, FIG. 3, FIG. 12, FIG. 13, and/or FIG. 14, and/or a core network 130 and/or controller 120 as seen in FIG. 1 and/or FIG. 12. Method 1500-c may be an example of method 1500-a of FIG. 15A.

At block 1505-b, a scaling factor of the flexible bandwidth system may be identified. In some embodiments, one or more aspects of the flexible bandwidth system are scaled based on the scaling factor as shown in block 1510-b. The scaling of the one or more aspects of the flexible bandwidth system may be compensated for through altering one or more aspects within a code domain utilizing one or more steps as shown in block 1515-b. For example, at block 1530, a voice frame may be received from a MAC layer. At block 1535, one or more slot boundaries may be determined with respect to one or more normal frame boundaries at a PHY layer. At block 1537, the voice frame may be transmitted at one of the one or more slot time boundaries to compensate for the scaling of the one or more aspects of the flexible bandwidth system. In some embodiments, transmitting the voice frame at one of the one or more slot time boundaries further includes delaying transmitting the voice frame by an additional slot time boundary.

Figure 15D:
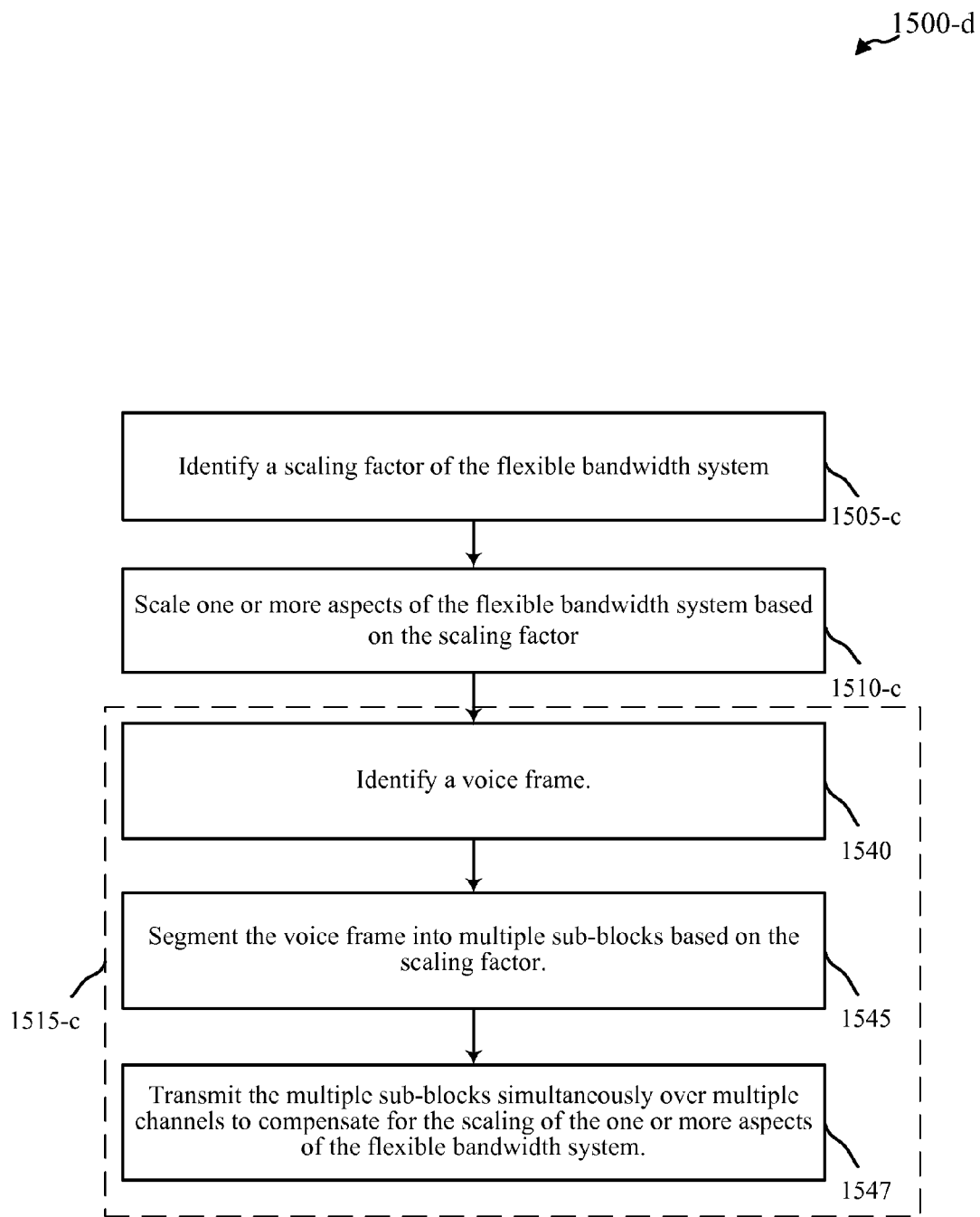
FIG. 15D shows a flow diagram of a method for providing voices services over a flexible bandwidth system in accordance with various embodiments.

Turning to FIG. 15D, a flow diagram of a method 1500-d for providing a service, such as a voice service, over a flexible bandwidth system in accordance with various embodiments. Method 1500-d may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-d may be implemented utilizing various wireless communications devices including, but not limited to: a mobile device 115 as seen in FIG. 1, FIG. 2, FIG. 3, FIG. 12, FIG. 13, and/or FIG. 14, and/or a core network 130 and/or controller 120 as seen in FIG. 1 and/or FIG. 12. Method 1500-d may be an example of method 1500-a of FIG. 15A.

At block 1505-c, a scaling factor of the flexible bandwidth system may be identified. In some embodiments, one or more aspects of the flexible bandwidth system are scaled based on the scaling factor as shown in block 1510-c. The scaling of the one or more aspects of the flexible bandwidth system may be compensated for through altering one or more aspects within a code domain utilizing one or more steps as shown in block 1515-c. For example, at block 1540, a voice frame may be identified. At block 1545, the voice frame may be segmented into multiple sub-blocks based on the scaling factor. At block 1547, the multiple sub-blocks may be transmitted simultaneously over multiple channels to compensate for the scaling of the one or more aspects of the flexible bandwidth system. The number, or cardinality, of channels may equal the scaling factor. The number, or cardinality, of the multiple channels may exceed the scaling factor.

Figure 15E:
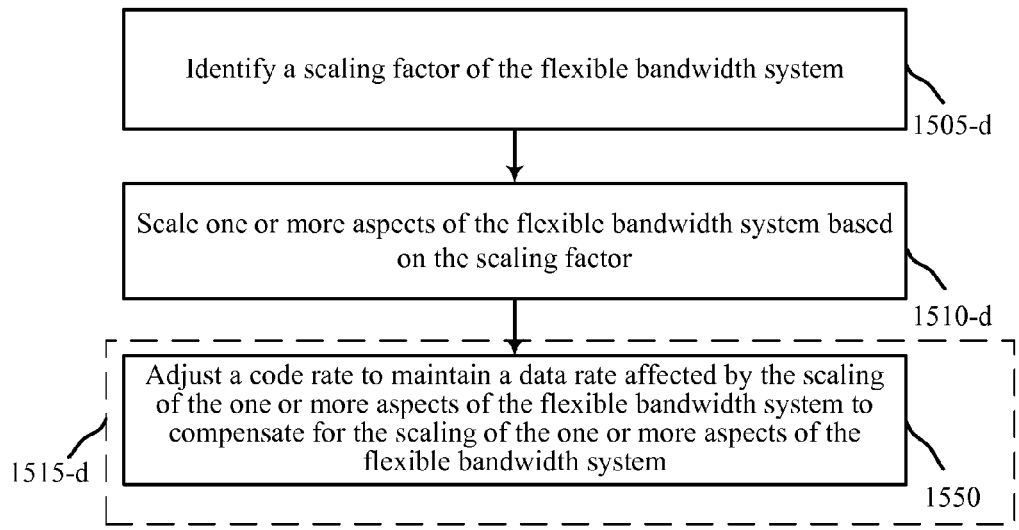
FIG. 15E shows a flow diagram of a method for providing voices services over a flexible bandwidth system in accordance with various embodiments.

Turning to FIG. 15E, a flow diagram of a method 1500-e for providing a service, such as a voice service, over a flexible bandwidth system in accordance with various embodiments. Method 1500-e may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-e may be implemented utilizing various wireless communications devices including, but not limited to: a mobile device 115 as seen in FIG. 1, FIG. 2, FIG. 3, FIG. 12, FIG. 13, and/or FIG. 14, and/or a core network 130 and/or controller 120 as seen in FIG. 1 and/or FIG. 12. Method 1500-e may be an example of method 1500-a of FIG. 15A.

At block 1505-d, a scaling factor of the flexible bandwidth system may be identified. In some embodiments, one or more aspects of the flexible bandwidth system are scaled based on the scaling factor as shown in block 1510-d. The scaling of the one or more aspects of the flexible bandwidth system may be compensated for through altering one or more aspects within a code domain utilizing one or more steps as shown in block 1515-d. For example, at block 1550, a code rate may be adjusted to maintain a data rate affected by the scaling of the one or more aspects of the flexible bandwidth system to compensate for the scaling of the one or more aspects of the flexible bandwidth system.

Figure 15F:
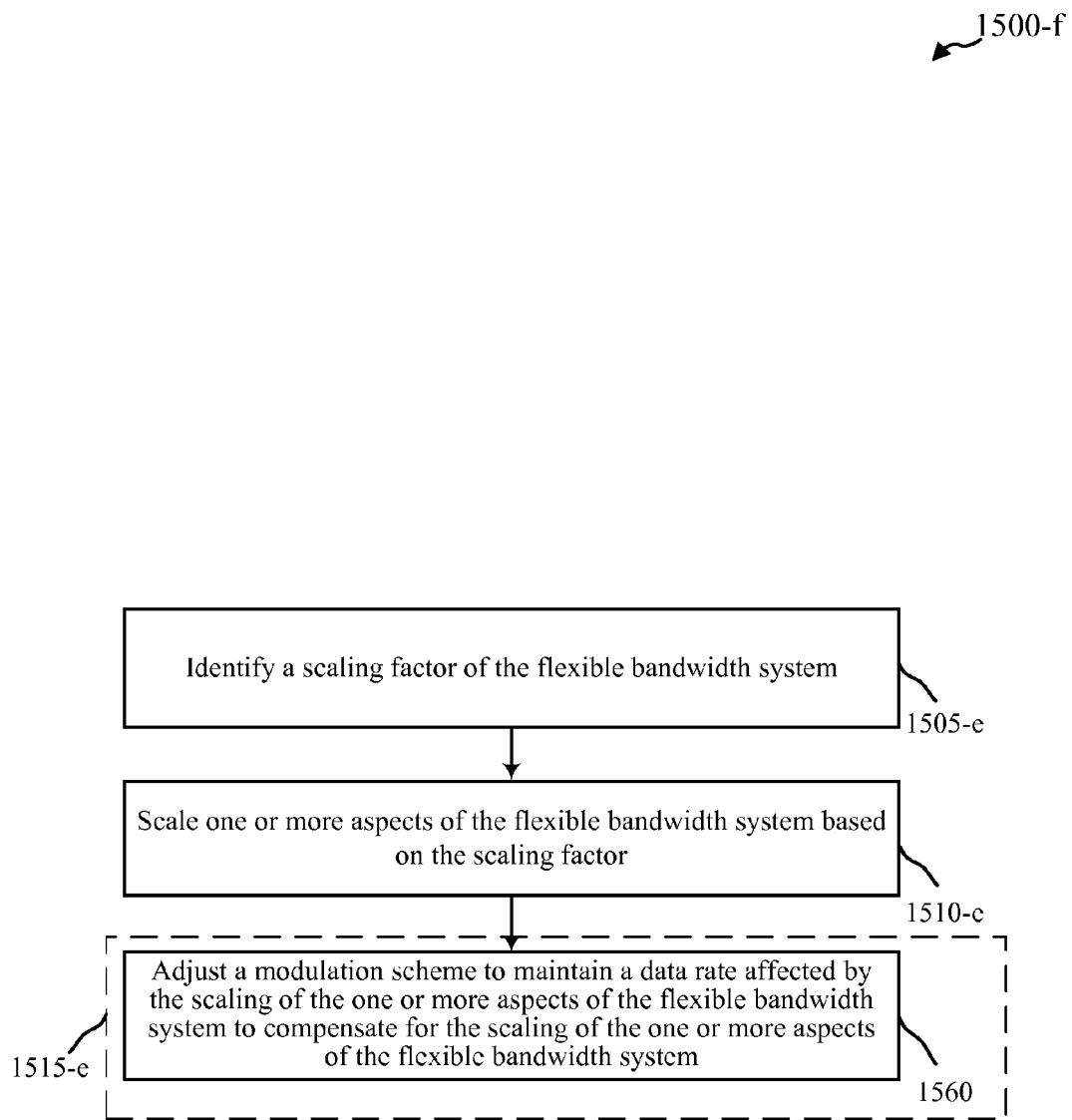
FIG. 15F shows a flow diagram of a method for providing voices services over a flexible bandwidth system in accordance with various embodiments.

Turning to FIG. 15F, a flow diagram of a method 1500-f for providing a service, such as a voice service, over a flexible bandwidth system in accordance with various embodiments. Method 1500-f may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-f may be implemented utilizing various wireless communications devices including, but not limited to: a mobile device 115 as seen in FIG. 1, FIG. 2, FIG. 3, FIG. 12, FIG. 13, and/or FIG. 14, and/or a core network 130 and/or controller 120 as seen in FIG. 1 and/or FIG. 12. Method 1500-f may be an example of method 1500-a of FIG. 15A.

At block 1505-e, a scaling factor of the flexible bandwidth system may be identified. In some embodiments, one or more aspects of the flexible bandwidth system are scaled based on the scaling factor as shown in block 1510-e. The scaling of the one or more aspects of the flexible bandwidth system may be compensated for through altering one or more aspects within a code domain utilizing one or more steps as shown in block 1515-e. For example, at block 1560, a modulation scheme may be adjusted to maintain a data rate affected by the scaling of the one or more aspects of the flexible bandwidth system to compensate for the scaling of the one or more aspects of the flexible bandwidth system.

Figure 15G:
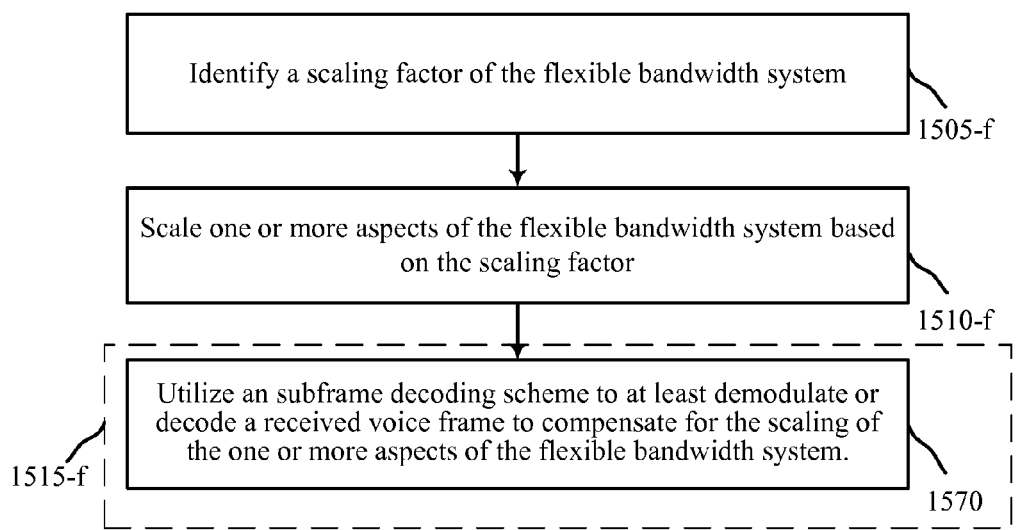
FIG. 15G shows a flow diagram of a method for providing voices services over a flexible bandwidth system in accordance with various embodiments.

Turning to FIG. 15G, a flow diagram of a method 1500-g for providing a service, such as a voice service, over a flexible bandwidth system in accordance with various embodiments. Method 1500-g may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-g may be implemented utilizing various wireless communications devices including, but not limited to: a mobile device 115 as seen in FIG. 1, FIG. 2, FIG. 3, FIG. 12, FIG. 13, and/or FIG. 14, and/or a core network 130 and/or controller 120 as seen in FIG. 1 and/or FIG. 12. Method 1500-g may be an example of method 1500-a of FIG. 15A.

At block 1505-f, a scaling factor of the flexible bandwidth system may be identified. In some embodiments, one or more aspects of the flexible bandwidth system are scaled based on the scaling factor as shown in block 1510-E The scaling of the one or more aspects of the flexible bandwidth system may be compensated for through altering one or more aspects within a code domain utilizing one or more steps as shown in block 1515-E For example, at block 1570, may utilize a subframe decoding scheme to at least demodulate or decode a received voice frame to compensate for the scaling of the one or more aspects of the flexible bandwidth system.

Figure 15H:
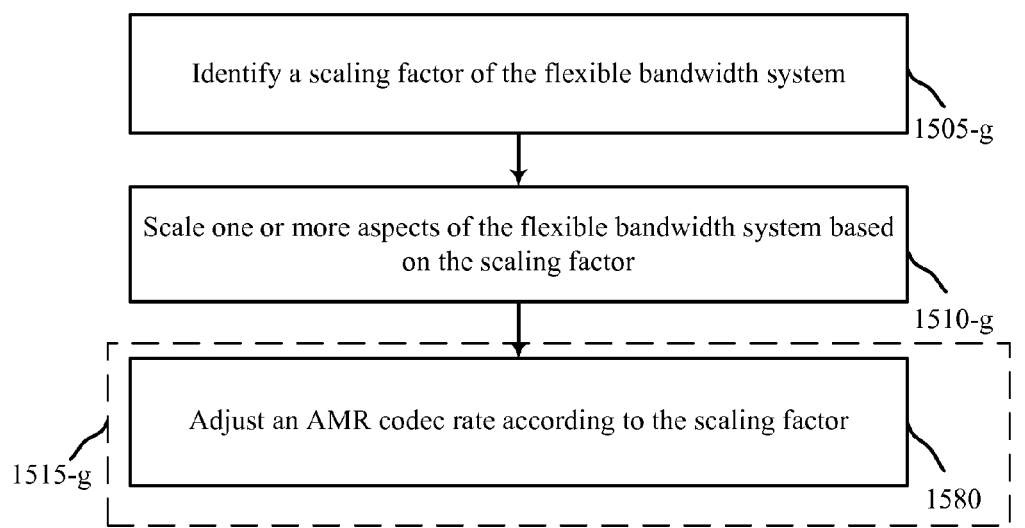
FIG. 15H shows a flow diagram of a method for providing voices services over a flexible bandwidth system in accordance with various embodiments.

Turning to FIG. 15H, a flow diagram of a method 1500-h for providing a service, such as a voice service, over a flexible bandwidth system in accordance with various embodiments. Method 1500-h may be implemented utilizing various wireless communications devices including, but not limited to: a base station 105 as seen in FIG. 1, FIG. 2, FIG. 3, FIG. 12, and/or FIG. 14; and/or a device 400 as seen in FIG. 4. In some embodiments, method 1500-f may be implemented utilizing various wireless communications devices including, but not limited to: a mobile device 115 as seen in FIG. 1, FIG. 2, FIG. 3, FIG. 12, FIG. 13, and/or FIG. 14; and/or a core network 130 and/or controller 120 as seen in FIG. 1 and/or FIG. 12. Method 1500-f may be an example of method 1500-a of FIG. 15A.

At block 1505-g, a scaling factor of the flexible bandwidth system may be identified. In some embodiments, one or more aspects of the flexible bandwidth system are scaled based on the scaling factor as shown in block 1510-g. The scaling of the one or more aspects of the flexible bandwidth system may be compensated for through altering one or more aspects within a code domain utilizing one or more steps as shown in block 1515-g. For example, at block 1580, an AMR codec rate may be adjusted based on the scaling factor.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for providing voice service over a flexible bandwidth system, the method comprising:
   identifying a scaling factor of the flexible bandwidth system, wherein the scaling factor is substantially equal to a ratio between a normal carrier bandwidth and a flexible carrier bandwidth;
   scaling one or more aspects of the flexible bandwidth system based on the scaling factor, the one or more aspects of the flexible bandwidth system including at least a flexible waveform; and
   compensating for the scaling of the one or more aspects of the flexible bandwidth system through altering one or more aspects within a code domain by identifying a spreading factor and adjusting the spreading factor utilizing the scaling factor to generate an adjusted spreading factor, the compensating being applied to a voice frame and further comprising:
      segmenting the voice frame into a plurality of sub-blocks based on the scaling factor; and
      transmitting the plurality of sub-blocks in parallel over a plurality of channels.

2. The method of claim 1, further comprising:
   applying rate tuning matching through at least a puncturing process or a repetition process.

3. The method of claim 1, further comprising:
   increasing a transmission power to compensate for at least the adjusted spreading factor or a slower power control.

4. The method of claim 1, wherein compensating for the scaling of the one or more aspects of the flexible bandwidth system through altering one or more aspects within the code domain further comprises:
   receiving a voice frame from a MAC layer;
   determining one or more slot time boundaries with respect to a one or more normal frame boundaries at a PHY layer; and
   transmitting the voice frame at one of the one or more slot time boundaries.

5. The method of claim 4, wherein transmitting the voice frame at one of the one or more slot time boundaries further comprises:
   delaying transmitting the voice frame by a period of time.

6. The method of claim 5, wherein the period of time comprises an additional slot time boundary.

7. The method of claim 1, wherein a cardinality of the plurality of channels equals the scaling factor.

8. The method of claim 1, wherein a cardinality of the plurality of channels exceeds the scaling factor.

9. The method of claim 1, wherein compensating for the scaling of the one or more aspects of the flexible bandwidth system through altering one or more aspects within the code domain further comprises:
   adjusting a code rate to maintain a data rate affected by the scaling of the one or more aspects of the flexible bandwidth system.

10. The method of claim 1, wherein compensating for the scaling of the one or more aspects of the flexible bandwidth system through altering one or more aspects within the code domain further comprises:
    adjusting a modulation scheme to maintain a data rate affected by the scaling of the one or more aspects of the flexible bandwidth system.

11. The method of claim 1, wherein compensating for the scaling of the one or more aspects of the flexible bandwidth system through altering one or more aspects within the code domain further comprises:
    utilizing a subframe decoding scheme to at least demodulate or decode a received voice frame.

12. The method of claim 1, wherein compensating for the scaling of the one or more aspects of the flexible bandwidth system through altering one or more aspects within the code domain further comprises:
    adjusting an AMR codec rate based on the scaling factor.

13. A wireless communications system configured for providing voice service over a flexible bandwidth system, the wireless communications system comprising:
    means for identifying a scaling factor of the flexible bandwidth system, wherein the scaling factor is substantially equal to a ratio between a normal carrier bandwidth and a flexible carrier bandwidth;
    means for scaling one or more aspects of the flexible bandwidth system based on the scaling factor, the one or more aspects of the flexible bandwidth system including at least a flexible waveform; and
    means for compensating for the scaling of the one or more aspects of the flexible bandwidth system through altering one or more aspects within a code domain-by identifying a spreading factor and adjusting the spreading factor utilizing the scaling factor to generate an adjusted spreading factor, the compensating being applied to a voice frame, wherein the means for compensating further comprises:
       means for segmenting the voice frame into a plurality of sub-blocks based on the scaling factor; and
       means for transmitting the plurality of sub-blocks in parallel over a plurality of channels.

14. The wireless communications system of claim 13, further comprising:
    means for applying rate tuning matching through at least a puncturing process or a repetition process.

15. The wireless communications system of claim 13, further comprising:
    means for increasing a transmission power to compensate at least for the adjusted spreading factor or a slower power control.

16. The wireless communications system of claim 13, wherein the means for compensating for the scaling of the one or more aspects of the flexible bandwidth system through altering one or more aspects within the code domain further comprises:
  means for receiving a voice frame from a MAC layer;
  means for determining one or more slot time boundaries with respect to a one or more normal frame boundaries at a PHY layer; and
  means for transmitting the voice frame at one of the one or more slot time boundaries.

17. The wireless communications system of claim 16, wherein the means for transmitting the voice frame at one of the one or more slot time boundaries further comprises:
  means for delaying transmitting the voice frame by a period of time.

18. The wireless communications system of claim 17, wherein the period of time comprises an additional slot time boundary.

19. The wireless communications system of claim 13, wherein a cardinality of the plurality of channels equals the scaling factor.

20. The wireless communications system of claim 13, wherein a cardinality of the plurality of channels exceeds the scaling factor.

21. The wireless communications system of claim 13, wherein the means for compensating for the scaling of the one or more aspects of the flexible bandwidth system through altering one or more aspects within the code domain further comprises:
  means for adjusting a code rate to maintain a data rate affected by the scaling of the one or more aspects of the flexible bandwidth system.

22. The wireless communications system of claim 13, wherein the means for compensating for the scaling of the one or more aspects of the flexible bandwidth system through altering one or more aspects within the code domain further comprises:
  means for adjusting a modulation scheme to maintain a data rate affected by the scaling of the one or more aspects of the flexible bandwidth system.

23. The wireless communications system of claim 13, wherein the means for compensating for the scaling of the one or more aspects of the flexible bandwidth system through altering one or more aspects within the code domain further comprises:
  means for utilizing a subframe decoding scheme to at least demodulate or decode a received voice frame.

24. The wireless communications system of claim 13, wherein the means for compensating for the scaling of the one or more aspects of the flexible bandwidth system through altering one or more aspects within the code domain further comprises:
  means for adjusting an AMR codec rate based on the scaling factor.

25. A computer program product for providing voice service over a flexible bandwidth system comprising:
  a non-transitory computer-readable medium, including code executable by a processor, the code comprising:
  code for identifying a scaling factor of the flexible bandwidth system, wherein the scaling factor is substantially equal to a ratio between a normal carrier bandwidth and a flexible carrier bandwidth;
  code for scaling one or more aspects of the flexible bandwidth system based on the scaling factor, the one or more aspects of the flexible bandwidth system including at least a flexible waveform; and
  code for compensating for the scaling of the one or more aspects of the flexible bandwidth system through altering one or more aspects within a code domain by identifying a spreading factor and adjusting the spreading factor utilizing the scaling factor to generate an adjusted spreading factor, the compensating being applied to a voice frame, wherein the code for compensating further comprises:
  code for segmenting the voice frame into a plurality of sub-blocks based on the scaling factor; and
  code for transmitting the plurality of sub-blocks in parallel over a plurality of channels.

26. The computer program product of claim 25, wherein the non-transitory computer-readable medium further comprising:
  code for applying rate tuning matching through at least a puncturing process or a repetition process.

27. The computer program product of claim 25, wherein the non-transitory computer-readable medium further comprising:
  code for increasing a transmission power to compensate at least for the adjusted spreading factor or a slower power control.

28. The computer program product of claim 25, wherein the code for compensating for the scaling of the one or more aspects of the flexible bandwidth system through altering one or more aspects within the code domain further comprises:
  code for receiving a voice frame from a MAC layer;
  code for determining one or more slot time boundaries with respect to a one or more normal frame boundaries at a PHY layer; and
  code for transmitting the voice frame at one of the one or more slot time boundaries.

29. The computer program product of claim 28, wherein the code for transmitting the voice frame at one of the one or more slot time boundaries further comprises:
  code for delaying transmitting the voice frame by a period of time.

30. The computer program product of claim 29, wherein the period of time comprises an additional slot time boundary.

31. The computer program product of claim 25, wherein a cardinality of the plurality of channels equals the scaling factor.

32. The computer program product of claim 25, wherein a cardinality of the plurality of channels exceeds the scaling factor.

33. The computer program product of claim 25, wherein the code for compensating for the scaling of the one or more aspects of the flexible bandwidth system through altering one or more aspects within the code domain further comprises:
  code for adjusting a code rate to maintain a data rate affected by the scaling of the one or more aspects of the flexible bandwidth system.

34. The computer program product of claim 25, wherein the code for compensating for the scaling of the one or more aspects of the flexible bandwidth system through altering one or more aspects within the code domain further comprises:
  code for adjusting a modulation scheme to maintain a data rate affected by the scaling of the one or more aspects of the flexible bandwidth system.

35. The computer program product of claim 25, wherein the code for compensating for the scaling of the one or more aspects of the flexible bandwidth system through altering one or more aspects within the code domain further comprises:

code for utilizing a subframe decoding scheme to at least demodulate or decode a received voice frame.

36. The computer program product of claim 25, wherein the code for compensating for the scaling of the one or more aspects of the flexible bandwidth system through altering one or more aspects within the code domain further comprises:

code for adjusting an AMR codec rate based on the scaling factor.

37. A wireless communications device configured for providing voice service over a flexible bandwidth system, the wireless communications device comprising:

a memory;

at least one processor coupled to the memory and configured to:

identify a scaling factor of the flexible bandwidth system, wherein the scaling factor is substantially equal to a ratio between a normal carrier bandwidth and a flexible carrier bandwidth;

scale one or more aspects of the flexible bandwidth system based on the scaling factor, the one or more aspects of the flexible bandwidth system including at least a flexible waveform; and compensate for the scaling of the one or more aspects of the flexible bandwidth system through altering one or more aspects within a code domain by identifying a spreading factor and adjusting the spreading factor utilizing the scaling factor to generate an adjusted spreading factor, wherein the at least one processor is configured to apply the compensation to a voice frame, the at least one processor being further configured to:

segment the voice frame into a plurality of sub-blocks based on the scaling factor; and transmit the plurality of sub-blocks in parallel over a plurality of channels.

38. The wireless communications device of claim 37, wherein the at least one processor is further configured to:

apply rate tuning matching through at least a puncturing process or a repetition process.

39. The wireless communications device of claim 37, wherein the at least one processor is further configured to:

increase a transmission power to compensate for at least the adjusted spreading factor or a slower power control.

40. The wireless communications device of claim 37, wherein the at least one processor configured to compensate for the scaling of the one or more aspects of the flexible bandwidth system through altering one or more aspects within the code domain further comprises a configuration to:

receive a voice frame from a MAC layer;

determine one or more slot time boundaries with respect to a one or more normal frame boundaries at a PHY layer; and transmit the voice frame at one of the one or more slot time boundaries.

41. The wireless communications device of claim 40, wherein the at least one processor configured to transmit the voice frame at one of the one or more slot time boundaries is further configured to:

delay transmitting the voice frame by a period of time.

42. The wireless communications device of claim 41, wherein the period of time comprises an additional slot time boundary.

43. The wireless communications device of claim 37, wherein a cardinality of the plurality of channels equals the scaling factor.

44. The wireless communications device of claim 37, wherein a cardinality of the plurality of channels exceeds the scaling factor.

45. The wireless communications device of claim 37, wherein the at least one processor configured to compensate for the scaling of the one or more aspects of the flexible bandwidth system through altering one or more aspects within the code domain further comprises a configuration to:

adjust a code rate to maintain a data rate affected by the scaling of the one or more aspects of the flexible bandwidth system.

46. The wireless communications device of claim 37, wherein the at least one processor configured to compensate for the scaling of the one or more aspects of the flexible bandwidth system through altering one or more aspects within the code domain further comprises a configuration to:

adjust a modulation scheme to maintain a data rate affected by the scaling of the one or more aspects of the flexible bandwidth system.

47. The wireless communications device of claim 37, wherein the at least one processor configured to compensate for the scaling of the one or more aspects of the flexible bandwidth system through altering one or more aspects within the code domain further comprises a configuration to:

utilize a subframe decoding scheme to at least demodulate or decode a received voice frame.

48. The wireless communications device of claim 37, wherein the at least one processor configured to compensate for the scaling of the one or more aspects of the flexible bandwidth system through altering one or more aspects within the code domain further comprises a configuration to:

adjust an AMR codec rate based on the scaling factor.

* * * * *